(12) United States Patent
Numata et al.

(10) Patent No.: US 11,571,802 B2
(45) Date of Patent: Feb. 7, 2023

(54) ELECTRIC POWER TOOL

(71) Applicant: MAKITA CORPORATION, Anjo (JP)

(72) Inventors: Fumitoshi Numata, Anjo (JP); Hideharu Muto, Anjo (JP); Yasushi Ogura, Anjo (JP); Kenichi Tabushi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 265 days.

(21) Appl. No.: 16/756,826

(22) PCT Filed: Nov. 8, 2018

(86) PCT No.: PCT/JP2018/041460
§ 371 (c)(1),
(2) Date: Apr. 16, 2020

(87) PCT Pub. No.: WO2019/102852
PCT Pub. Date: May 31, 2019

(65) Prior Publication Data
US 2020/0262047 A1 Aug. 20, 2020

(30) Foreign Application Priority Data

Nov. 22, 2017 (JP) .............................. JP2017-224770

(51) Int. Cl.
*B23D 49/16* (2006.01)
*B25B 23/02* (2006.01)
(Continued)

(52) U.S. Cl.
CPC .............. *B25F 5/02* (2013.01); *B24B 23/028* (2013.01); *G08B 21/182* (2013.01); *B23D 49/162* (2013.01)

(58) Field of Classification Search
CPC .. B25F 5/02; B25H 3/00; B25H 3/006; F16M 13/02; F16M 13/022
(Continued)

(56) References Cited

U.S. PATENT DOCUMENTS 6,679,406 B2 * 1/2004 Sakai ................... B25B 23/045
224/904
7,896,103 B2 * 3/2011 Johnson .................... B25F 5/02
173/217
(Continued)

FOREIGN PATENT DOCUMENTS

AU        2003284667 A1    6/2004
CN        1705539 A    12/2005
(Continued)

OTHER PUBLICATIONS

Dec. 18, 2018 Written Opinion of the International Searching Authority issued in International Patent Application No. PCT/JP2018/041460.
(Continued)

*Primary Examiner* — Thanh K Truong
*Assistant Examiner* — Patrick B Fry
(74) *Attorney, Agent, or Firm* — Oliff PLC

(57) ABSTRACT

A metal wire may be provided inside a hanger portion extending with an annular shape and which is integrally formed with an outer casing. An electric power tool may be prevented from falling, etc. due to deformation or breakage of the hanger portion by being reinforced by the wire.

6 Claims, 22 Drawing Sheets

(51) Int. Cl.
*B25F 5/02* (2006.01)
*B25H 3/00* (2006.01)
*F16M 13/02* (2006.01)
*B24B 23/02* (2006.01)
*G08B 21/18* (2006.01)

(58) Field of Classification Search
USPC .................................................. 173/171, 217
See application file for complete search history.

(56) References Cited

U.S. PATENT DOCUMENTS

| | | |
|---|---|---|
| 2002/0122707 A1 | 9/2002 | Sakai et al. |
| 2004/0074938 A1 | 4/2004 | Sakai et al. |
| 2005/0092792 A1 | 5/2005 | Sakai et al. |
| 2007/0102462 A1 | 5/2007 | Sakai et al. |
| 2012/0085560 A1 | 4/2012 | Kuroyanagi et al. |
| 2012/0292865 A1 | 11/2012 | Sugimoto et al. |

FOREIGN PATENT DOCUMENTS

| | | |
|---|---|---|
| CN | 102441878 A | 5/2012 |
| JP | 2002-254358 A | 9/2002 |
| JP | 4327115 B2 | 9/2009 |
| JP | 2012-232377 A | 11/2012 |
| JP | 2016-124051 A | 7/2016 |
| TW | 200846560 A | 12/2008 |
| WO | 2011/111465 A1 | 9/2011 |

OTHER PUBLICATIONS

Dec. 18, 2018 International Search Report issued in International Patent Application No. PCT/JP2018/041460.

Aug. 26, 2022 Office Action issued in Chinese Patent Application No. 201880075766.2.

* cited by examiner

ELECTRIC POWER TOOL

CROSS-REFERENCE TO RELATED APPLICATIONS

The present application is a U.S. National Phase entry of, and claims priority to, PCT Application No. PCT/JP2018/041460, filed Nov. 8, 2018, which claims priority to Japanese Patent Application No. 2017-224770, filed Nov. 22, 2017, both of which are incorporated herein by reference in their entireties for all purposes.

BACKGROUND

The present disclosure relates to an electric power tool having a hanger portion to which a suspending member, such as, for example, a carabiner or a rope, can be attached.

Japanese Patent No. 4327115 discloses an electric power tool having an annular hanger part located at a jacket portion. A suspending member, such as a carabiner or a rope, may be inserted in a through hole (opening) formed in the annular hanger portion. An electric power tool may be suspended when this suspending member is hooked to a hook or a like provided at a handrail or scaffolding.

The hanger portion is subjected to a load corresponding to the weight of the electric power tool when it is suspended. If the hanger portion is deformed or cracked, the hanger portion could be further damaged due to the load applied while being suspended. As a result, the electric power tool may fall. However, if a large hanger portion is provided so as to be more resistant to the load, it may contact the user's arm or a work surface or the like, thereby deteriorating the usage comfort. In order to prevent the hanger portion from being deformed or damaged, it is desired to enhance its strength or toughness while maintaining a shape which does not disturb operation.

An object of the present disclosure is to provide an electric power tool having a hanger portion to which a suspending member, such as, for example, a carabiner or a rope that may be hooked to a handrail or a scaffolding, can be attached, and to prevent the hanger portion from being deformed or damaged.

BRIEF SUMMARY

According to one aspect of the present disclosure, an electric power tool includes a motor, a power source for supplying electric power to the motor, and an annular hanger portion, having a through hole, provided on an outer surface of an outer casing for enabling a suspending member to be attached thereto. This hanger portion is provided to have a greater strength and toughness than those of the outer casing. Therefore, deformation or damage of the hanger portion may be prevented. Accordingly, the electric power tool is prevented from falling due to deformation or damage at the hanger portion.

According to another aspect of the present disclosure, the electric power tool may include a metal reinforcement member embedded in the hanger portion. Therefore, deformation of the hanger portion may be prevented by the embedded metal reinforcement member. Further, the embedded metal reinforcement member may prevent the annular hanger portion from being broken.

According to another aspect of the present disclosure, the electric power tool may include a wire as the reinforcement member. This makes it possible to prevent the electric power tool from falling, etc., as long as a wire does not break. This is possible even when the resin forming the entire shape of the hanger portion breaks.

According to another aspect of the present disclosure, the electric power tool may have a half-split structure in which the hanger portion is split in a penetrating direction of a through hole. The reinforcement member may be interleaved between the half-split hanger portions. The reinforcement member may therefore be easily attached to the hanger portion.

According to another aspect of the present disclosure, the hanger portion may comprise a suspension detecting member configured to detect a suspended state in which an axis line connecting the hanger portion and the center of gravity is coincident with a gravity direction. The motor is electrically disconnected from the power source when the suspension detecting member detects the suspended state. This makes it is possible to prevent the motor from starting when the electric power tool is suspended by a suspending member, such as a carabiner or a rope or the like, inserted through the through hole of the hanger portion.

According to another aspect of the present disclosure, the hanger portion may include a deformation detecting member configured to detect a deformation of the hanger portion. The electric power tool may include a main switch, which is electrically disconnected from the motor when the deformation detecting member detects a deformation of the hanger portion greater than a predetermined amount. This makes it is possible to prevent the motor from starting when the electric power tool is falling due to the hanger portion being greatly deformed or damaged. For example, the motor can be prevented from starting even when the main switch is turned on, for instance due to the falling impact of the electric power tool.

According to another aspect of the present disclosure, the electric power tool may include an alarm means configured to inform the user of the deformation of the hanger portion. A user can thus be made aware of when the hanger portion is greatly deformed or damaged.

According to another aspect of the present disclosure, the hanger portion may be provided with a reinforcement member. The reinforcement member may be supported to the outer casing such that the reinforcement member is displaced relative to the hanger portion when the hanger portion is plastically deformed more than a predetermined amount from an initial state or when the hanger portion is damaged. Therefore, the user can be visually made aware, by a position of the reinforcement member, that the hanger portion is greatly deformed or damaged.

According to another aspect, the outer casing may comprise a columnar portion. The hanger portion may have a linear member that is flexible. The linear member may have an annular shape enclosing the through hole and the columnar portion therein. Therefore, since the linear member is flexible, it does not easily break by a falling impact, etc. Even when the hanger portion made of a resin or the like breaks, the linear member remains unbroken, so that the hooked state of the electric power tool can be maintained by the linear member. Further, the linear member is hooked to the columnar portion, the columnar portion having relatively a high strength. Therefore, even when a part of the hanger portion is damaged, the linear member does not slip out of the outer casing. The falling of the electric power tool can thereby be prevented. In addition, the linear member can be produced relatively inexpensively, since its structure is relatively simple.

DETAILED DESCRIPTION

Figure 1:
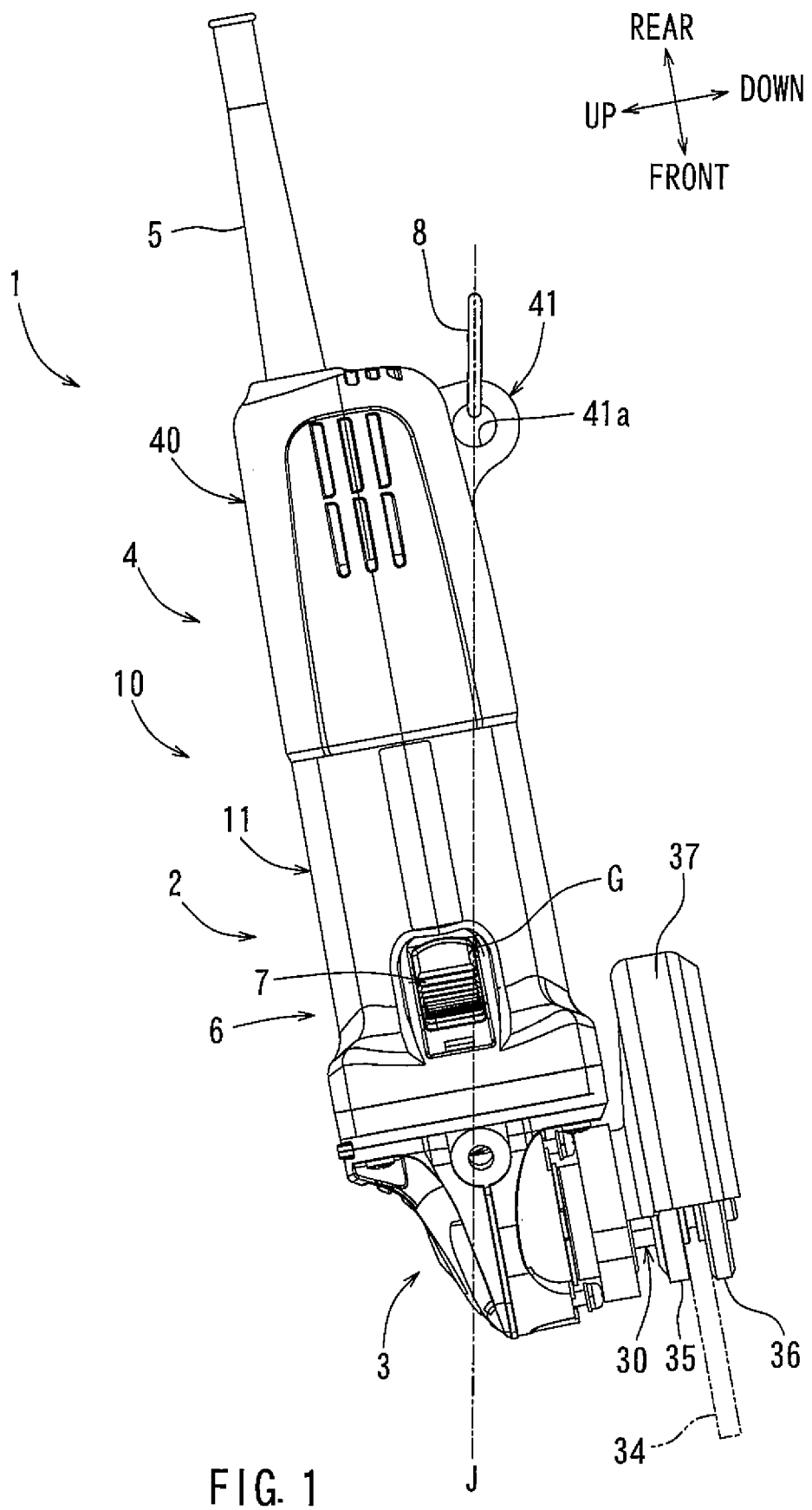
FIG. 1 is a side view of an electric power tool according to a first embodiment.
Figure 2:
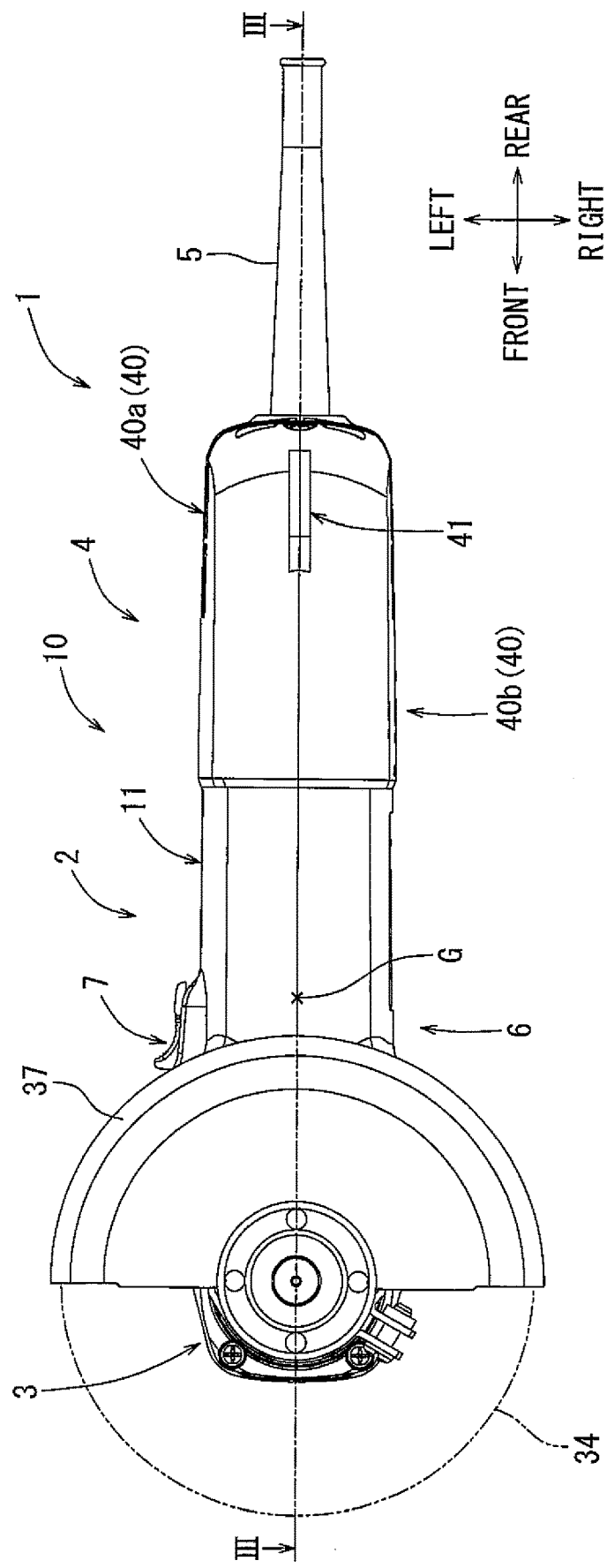
FIG. 2 is a bottom view of the electric power tool according to the first embodiment.
Figure 3:
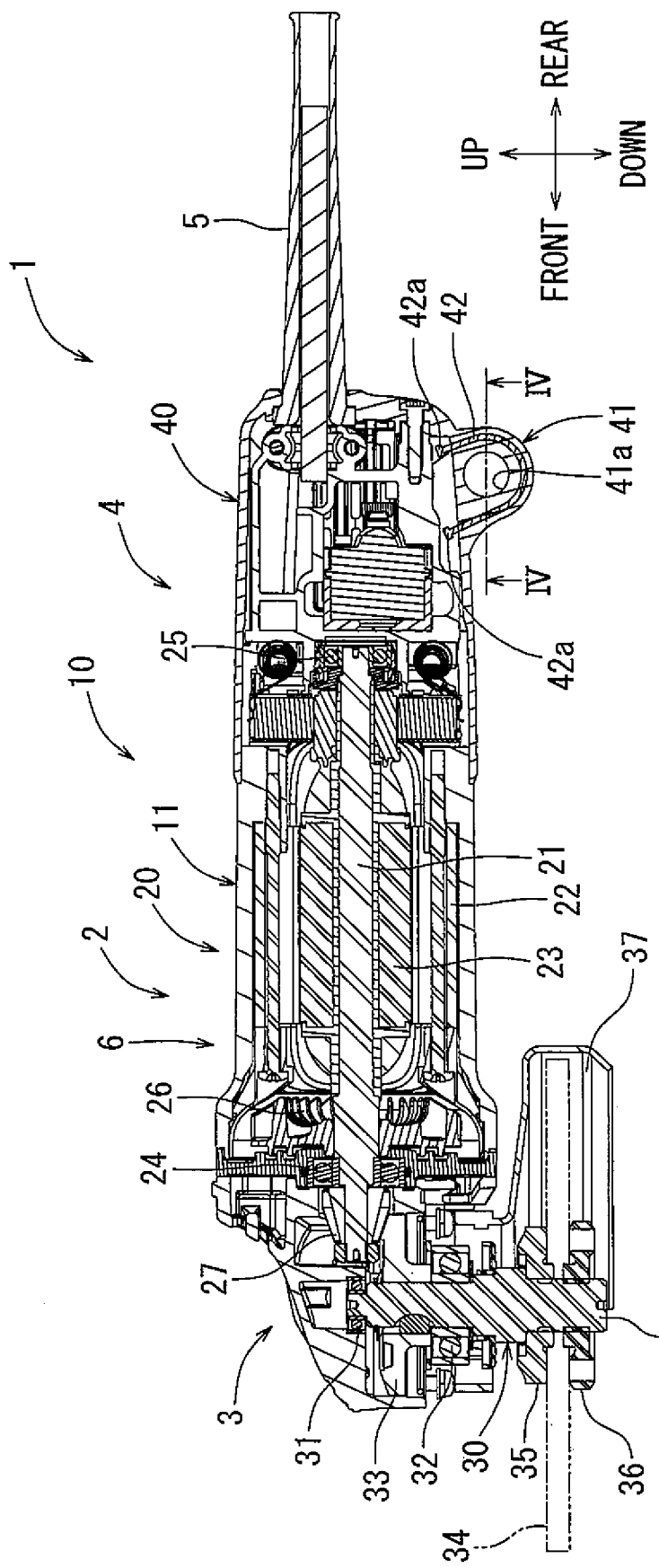
FIG. 3 is a cross-sectional view taken along line of FIG. 2.

Hereinafter, a first embodiment of the present disclosure will be described with reference to FIGS. 1 to 4. One example of an electric power tool 1 according to the first embodiment is an electric power tool that is used for polishing a work surface by rotating a disc-shaped end tool, which is referred to as a so-called grinder. As shown in FIGS. 1 and 3, the electric power tool 1 according to the present embodiment may include a tool main body portion 10 extending in a frontward/rearward direction. The tool main body portion 10 comprises a motor accommodating portion 2, a gear head portion 3, and a main body rear portion 4. The motor accommodating portion is a center portion with respect to the frontward/rearward direction and is configured to accommodate a motor 20. The gear head portion 3 is provided in front of the motor accommodating portion 2 and has a spindle 30. The main body rear portion 4 is provided behind the motor accommodating portion 2. A power cord 5 is connected to the main body portion 4, so as to extend further in a rearward direction. In the following description, with respect to frontward/rearward/upward/downward directions, a front side is set as a side where the spindle 30 is provided in an extending direction of the tool main body 10. A side where the spindle extends 30 is set as a lower side. A user may be positioned behind the electric power tool 1 and grip the electric power tool 1. A left/right direction is determined with reference to the user.

As shown in FIGS. 1 and 3, a jacket portion of the tool main body 10 may be covered by a main body housing 11, which may substantially have a cylindrical shape. A part of the main body housing 11 corresponding to the jacket portion of the motor accommodating portion 2 is configured to be a grip portion 6, covered with an elastomer material, so that the user can grasp the tool. The grip portion 6 may be provided with a switch lever (which is an embodiment of a main switch) 7. A motor 20 may start when the switch lever 7 is turned on. The motor 20 may stop when the switch lever 7 is turned off. An outer casing 40 made of resin may be provided at a main body rear portion 4. The outer casing 40 may cover an outer peripheral surface of the main body housing 11. As shown in FIG. 2, the outer casing 40 may have a half-split structure, which can be split into left and right halves, such as a left half-split portion 40a and a right half-split portion 40b, substantially at the center in the left/right direction. The power cord 5 may be electrically connected to an external power source to supply electric power.

As shown in FIG. 3, a motor shaft 21 of the motor 20 may be accommodated in the motor accommodating portion 2 so as to extend in the frontward/rearward direction. The motor shaft 21 may be rotatably supported about its axis by a front bearing 24 and a rear bearing 25. A stator 22 of the motor 20 may be disposed along an inner peripheral surface of the main body housing 11 of the motor accommodating portion 2. A rotor 23 of the motor 20 may be provided so as to face the stator 22 in a radial direction of the motor shaft 21. The rotor 23 may rotate integrally with the motor shaft 21. A cooling fan 26 may be provided in front of the rotor 23, so as to be able to rotate integrally with the motor shaft 21. A drive side bevel gear 27 may be provided at a front end of the motor shaft 21, the end extending into a front gear head portion 3 located in front of the front bearing 24, so as to be rotatable integrally with the motor shaft 21.

As shown in FIG. 3, the spindle 30, which extends in the upward/downward direction intersecting (orthogonal to) the motor shaft 21, may be provided at the gear head portion 3. The spindle 30 may be rotatably supported about its axis by an upper bearing 31 and a lower bearing 32. A driven side bevel gear 33 may be provided between the upper bearing 31 and the lower bearing 32, so as to rotate integrally with the spindle 30. The driven side bevel gear 33 may mesh with the drive side bevel gear 27. The rotational drive of the motor shaft 21 is transmitted to the spindle 30 via the drive side bevel gear 27 and the driven side bevel gear 33.

As shown in FIG. 3, a tip end 30a of the spindle 30 may protrude downward from the gear head portion 3. The front end tool 34 may be fixed to the tip end 30a by being clamped by an inner flange 35 and an outer flange 36 in the upward/downward direction. The front end tool 34 rotates coaxially with the spindle 30 when the spindle 30 rotates. A lower end portion of the rotating front end tool 34 polishes a work surface placed under the electric power tool 1. A wheel cover 37 configured to cover an upper side and a radially outer side of a rear half circumference of the front end tool 34 may be provided below the gear head portion 3. The wheel cover 37 may prevent the dust generated during polishing from being scattered toward the user.

Figure 4:
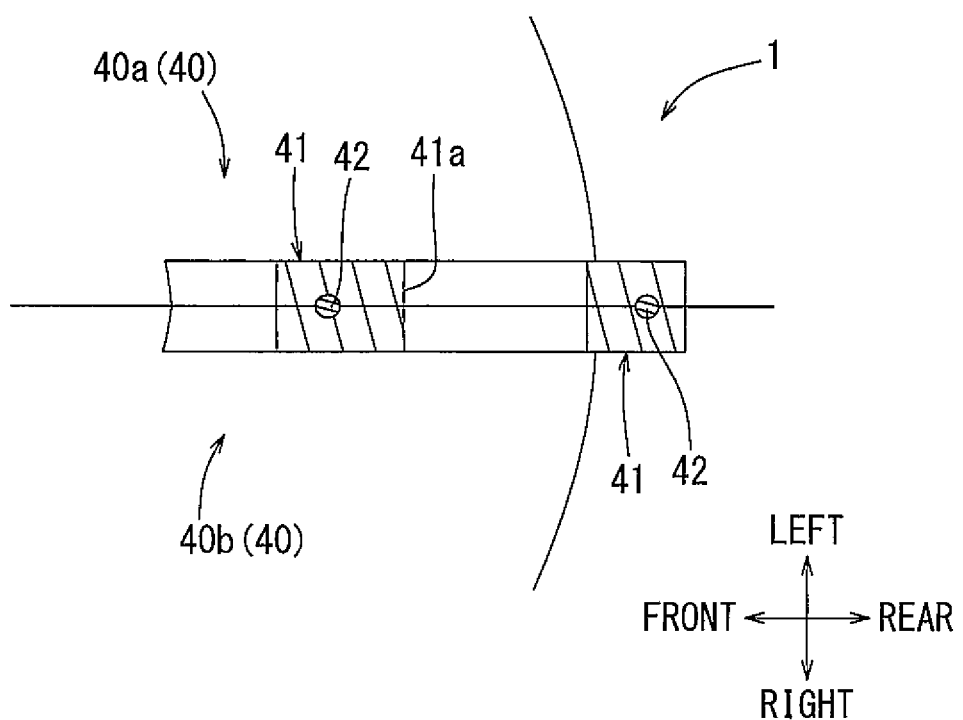
FIG. 4 is a cross-sectional view taken along line IV-IV of FIG. 3.

As shown in FIGS. 3 and 4, a hanger portion 41, which may have substantially an annular shape, may be provided at a lower portion of the outer casing 40. The hanger portion 41 may have a through hole 41a passing through the hanger portion 41 in the left/right direction. A metal wire (which is an embodiment of a reinforcement member) 42 having a high strength may be provided inside the hanger portion 41 so as to pass along a radially outer side of the through hole 41a. The wire 42 may pass through substantially the center of the hanger portion 41 in the thickness direction. Both ends of the wire 42 may protrude from the inner peripheral surface of the outer casing 40. A retaining portion 42a may be provided at the both ends of the wire 42 such that the wire 42 does not slip out from the outer casing 40. Portions of the hanger portion 41 may be integrally formed with the left half-split portion 40a and the right half-split portion 40b, respectively. The hanger portion 41 may have a half-split structure, which can be split into left and right halves substantially at the center in the left/right direction, similar to the left half-split portion 40a and a right half-split portion 40b. The wire 42 may be positioned inside the hanger portion 41 between the left and right halves of the hanger portion 41.

As shown in FIG. 1, a suspending member 8, such as a carabiner, a rope, or the like, may be inserted through the through hole 41a so as to be attached to the hanger portion 41. The electric power tool 1 may be suspended by hooking the attached suspending member 8 to a hook or the like provided at a handrail or a scaffolding. The center of gravity G of the electric power tool 1 may be located in the vicinity of the motor accommodating portion 2. The suspending member 8 may serve to suspend the electric power tool 1 from above, with respect to a rear semi-peripheral portion of the hanger portion 41. The electric power tool 1 may be suspended in a posture such that the axis J extends vertically in which the suspending member 8 positions above the center of gravity the axis also passing through the center of gravity G.

As described above, the strength at the hanger portion 41 may be enhanced by a high-strength metal wire 42 passing through the inside of the hanger portion 41, as shown in FIG. 3. Thereby, deformation or damage of the hanger portion 41 can be reduced. Further, even if the resin member, which serves to form the entire shape of the hanger portion 41, breaks, the high-strength metal wire 42 will not break. It is thus possible to prevent the electric power tool 1 from falling when the suspending member 8 passing through the hanger portion 41 is hooked to a hook or a like provided at a handrail or a scaffolding, as shown in FIG. 1. Furthermore, the hanger portion 41 may include a half-split structure split into left and right halves. The wire 42 is therefore easily attached to the inside of the hanger portion 41 during assembly.

Hereinafter, a second embodiment according to the present disclosure will be described with reference to FIGS. 5 and 6. The electric power tool 50 according to the second embodiment may include the hanger portion 51 shown in FIGS. 5 and 6, instead of the hanger portion 41 of the electric power tool 1 according to the first embodiment shown in FIGS. 1 to 4.

Figure 5:
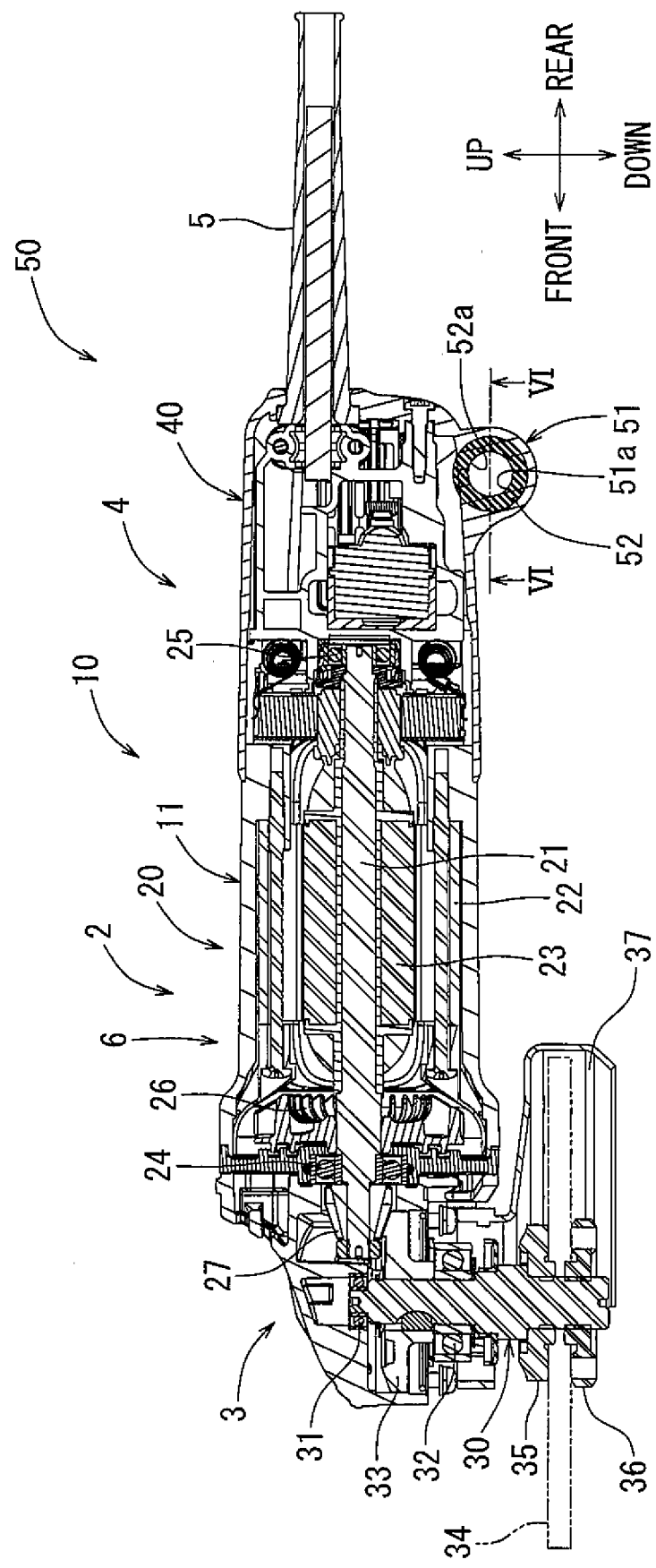
FIG. 5 is a vertical cross-sectional view of the electric power tool according to a second embodiment.
Figure 6:
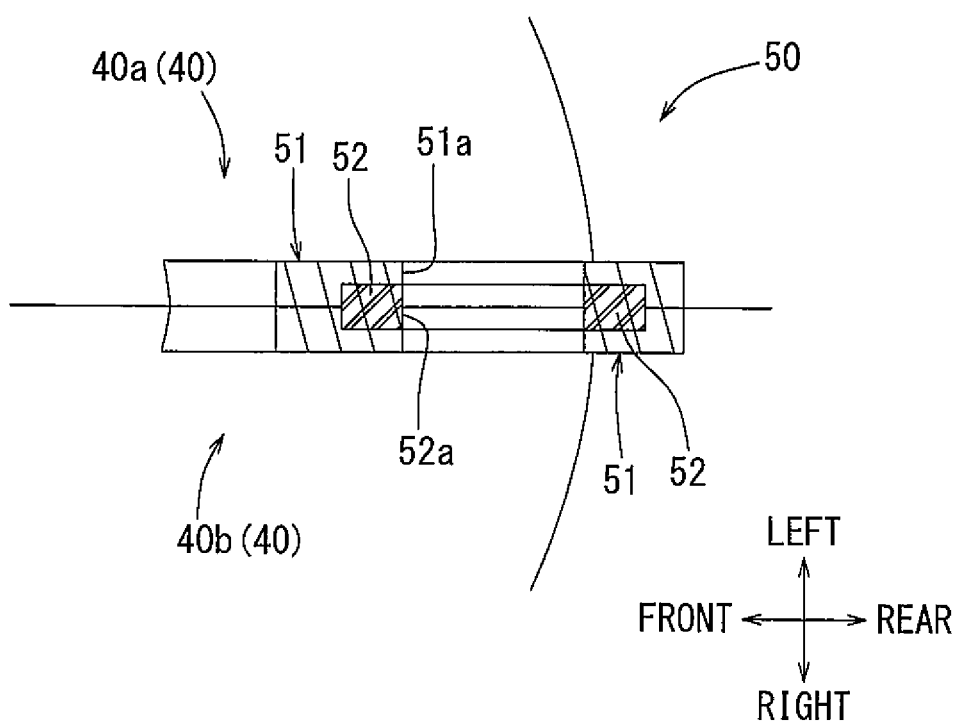
FIG. 6 is a cross-sectional view taken along line VI-VI of FIG. 5.

As shown in FIG. 5, the hanger portion 51, which may be annular, may be provided at a lower portion of the outer casing 40. A through hole 51a may pass through the hanger portion 51 in the left/right direction. A metal ring (which is an embodiment of a reinforcement member) 52 having a high strength may be provided inside of the hanger portion 51 so as to enclose a radially outer side of the through hole 51a. The ring 52 may have a washer-like shape with a through hole 52a, which may be circular, passing through the center of its disc shape. The outer diameter of the ring 52 is smaller than that of the hanger portion 51. The hole diameter of the through hole 52a is substantially the same as the hole diameter of the through hole 51a of the hanger portion 51. As shown in FIG. 6, the ring 52 may be arranged so as to pass through substantially the center of the of the hanger portion 51 in the thickness direction. The outer casing 40 and the hanger portion 51 may be integrally formed and be splittable into left and right halves. The ring 52 may be attached to the inside of the hanger portion 51 to be positioned between the left and right halves of the hanger portions 51. A suspending member 8 may pass through both the through hole 51a of the hanger portion 51 and the through hole 52a of the ring 52 and may be attached to the hanger portion 51.

As described above, the high-strength metal ring 52 may be provided as a reinforcement member in the hanger portion 51, as shown in FIG. 5. Thereby, the strength of the hanger portion 51 can be enhanced. Additionally, deformation and damage of the hanger portion 51 can be reduced. The suspending member 8 may be inserted into the hanger portion 51 by passing through both the through hole 51a of the hanger portion 51 and the through hole 52a of the ring 52. Even if the resin part of the hanger portion 51 with the through hole 51a breaks, the ring 52 with the through hole 52a does not break. It is thus possible to prevent the electric power tool 1 from falling when the suspending member 8 passing through the hanger portion 51 is hooked to a hook or the like provided at a handrail or a scaffolding. Furthermore, the hanger portion 51 may include a half-split structure split into left and right halves. The ring 52 is therefore easily attached to the inside of the hanger portion 51 during assembly.

Hereinafter, a third embodiment according to the present disclosure will be described with reference to FIGS. 7 to 10. An electric power tool 60 according to the third embodiment may have a hanger portion 61 shown in FIGS. 7 to 10, instead of the hanger portion 41 of the electric power tool 1 according to the first embodiment shown in FIGS. 1 to 4.

Figure 7:
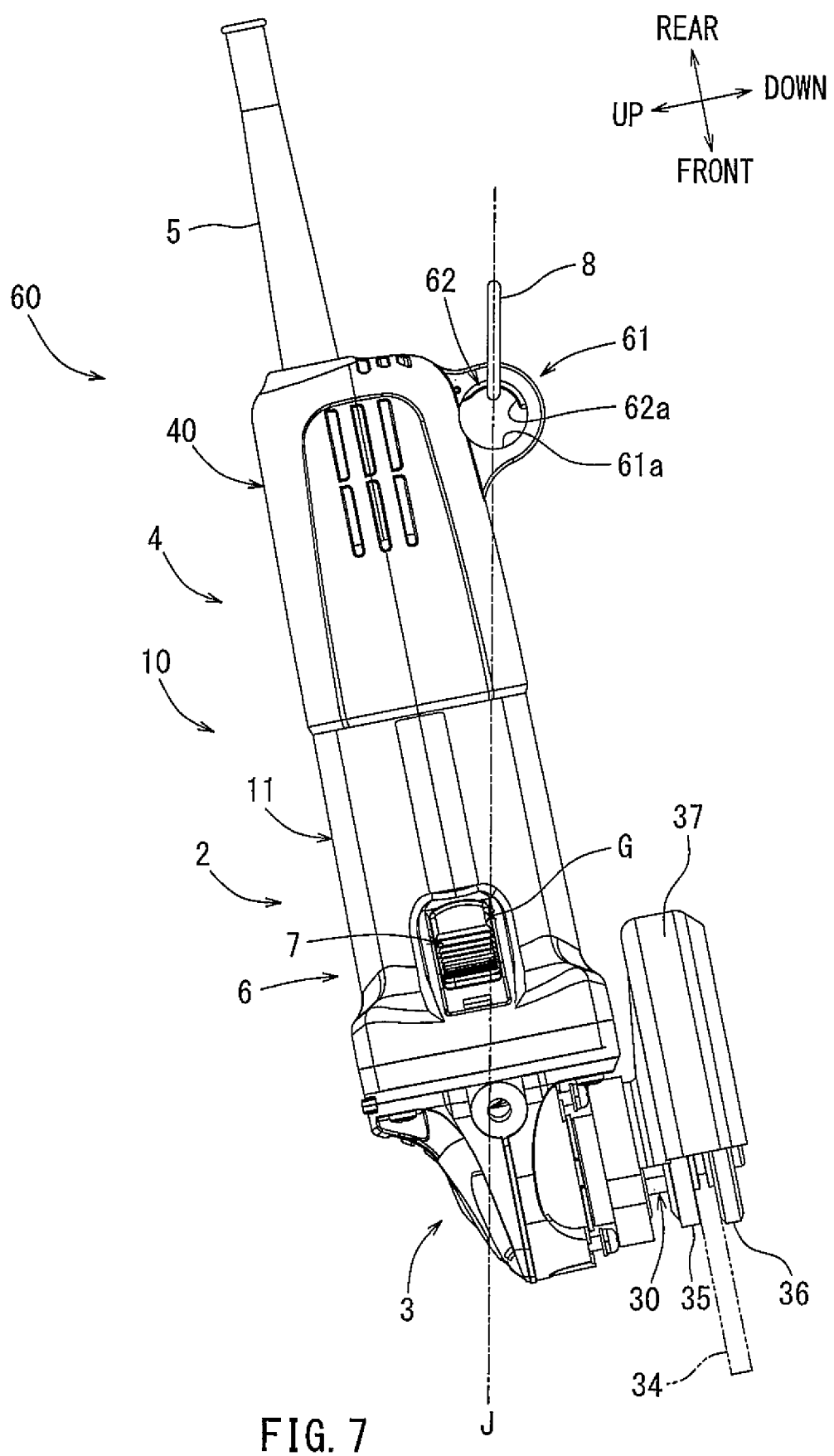
FIG. 7 is a side view of the electric power tool according to a third embodiment.
Figure 8:
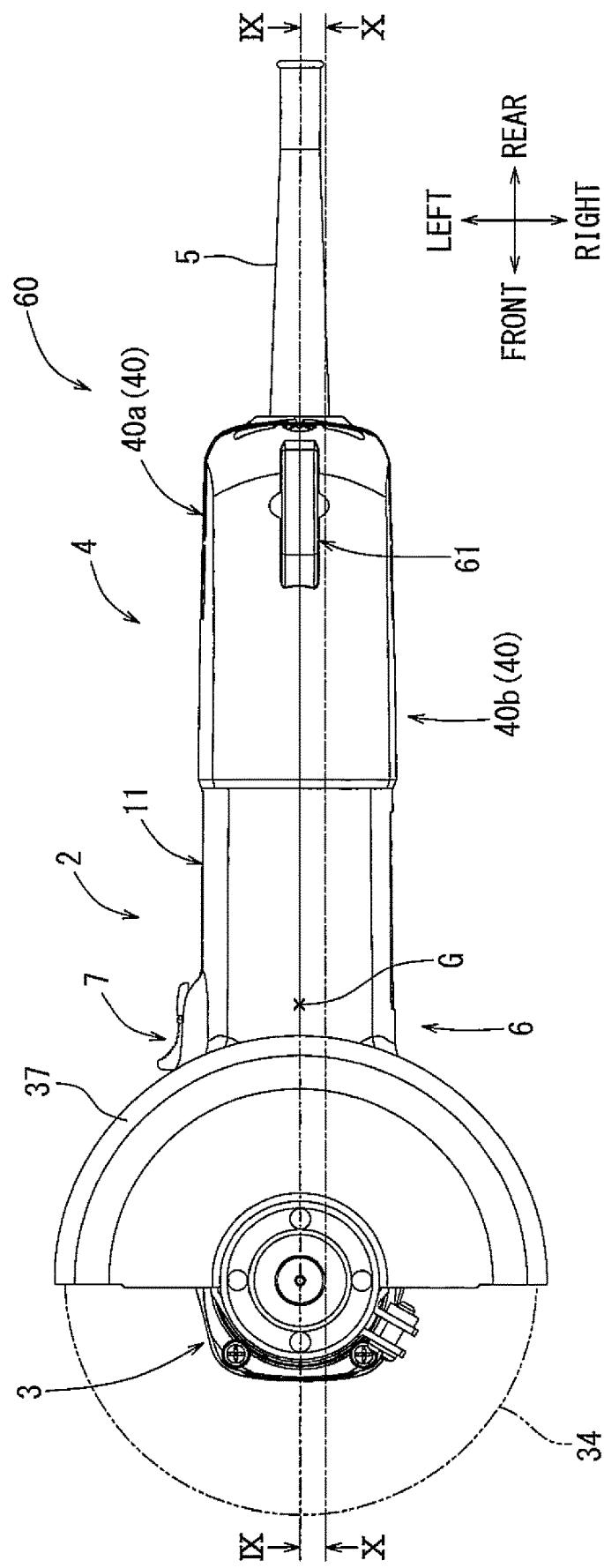
FIG. 8 is a bottom view of the electric power tool according to the third embodiment.
Figure 9:
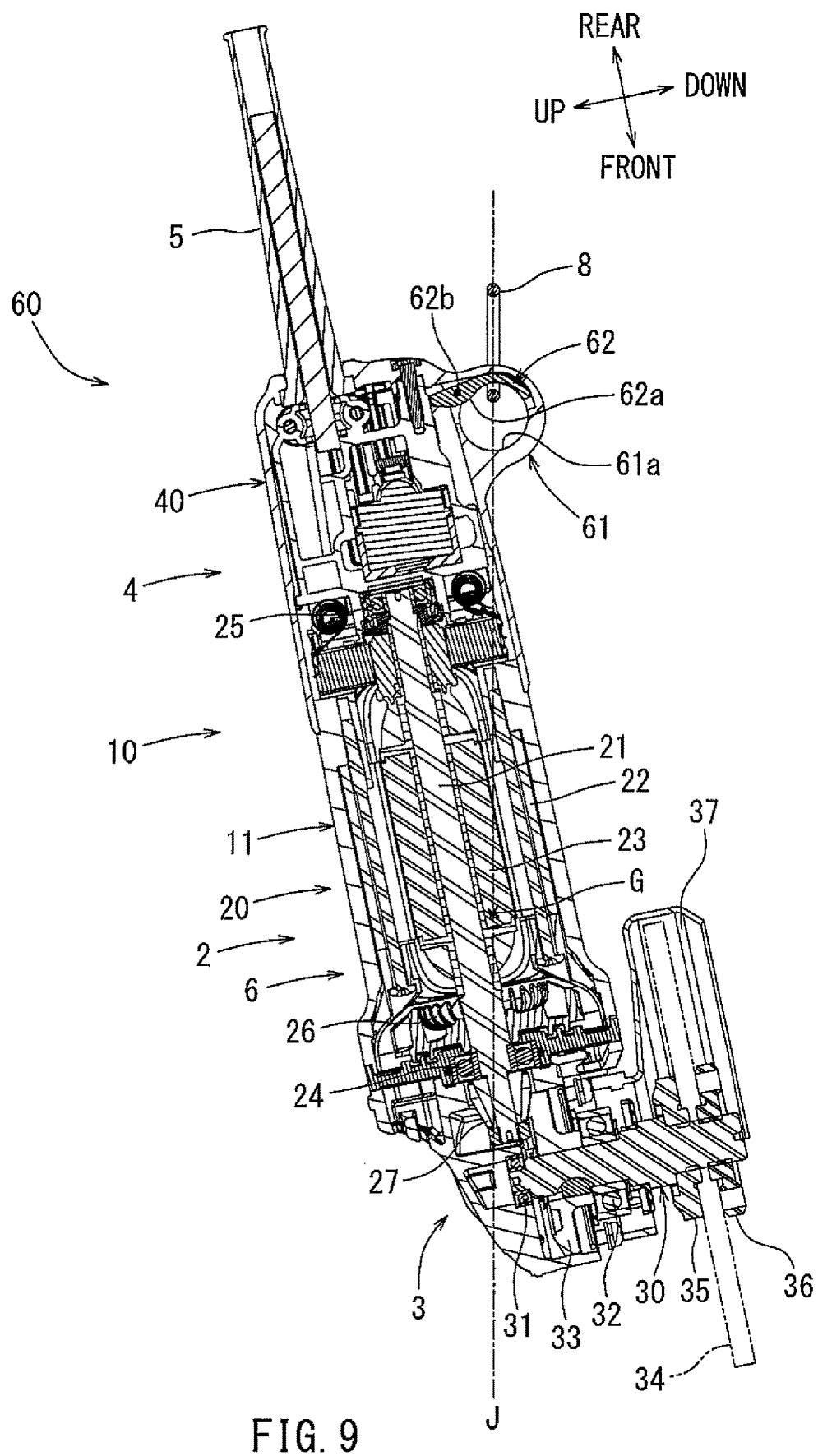
FIG. 9 is a cross-sectional view taken along line IX-IX of FIG. 8.
Figure 10:
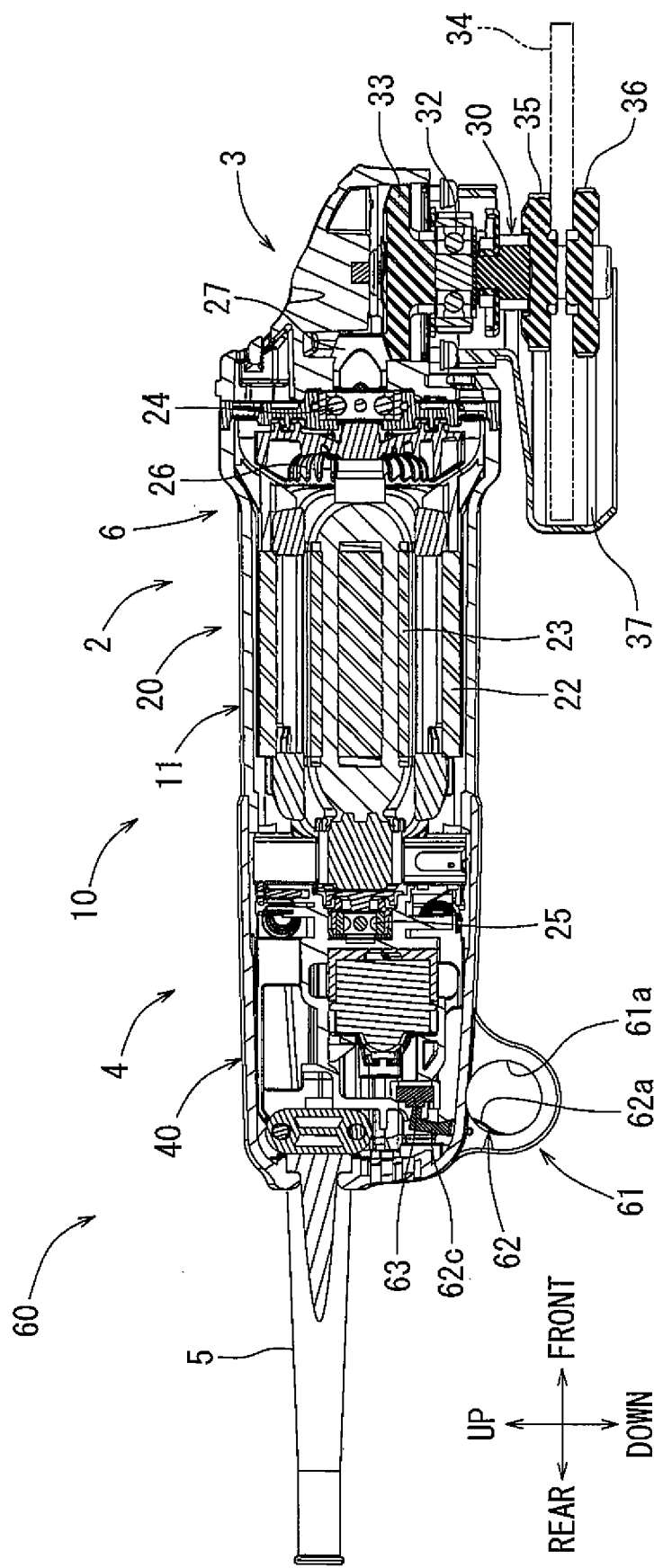
FIG. 10 is a cross-sectional view taken along line X-X of FIG. 8.

As shown in FIGS. 7 and 8, an hanger portion 61, which may be annular, may be provided at a lower portion of the outer casing 40. A through hole 61a may pass through the hanger portion 61 in the left/right direction. As shown in FIG. 9, a lever (which is an embodiment of a suspension detecting member or a reinforcement member) 62 may be provided so as to extend from a hanger portion 61 to the main body rear portion 4. The outer casing 40 and the hanger portion 61 may be integrally formed and be splittable into the left and right halves. The lever 62 may be attached to the inside of the hanger portion 61 and between the left and right halves of the hanger portions 61. The lever 62 may be rotatably provided about a fulcrum 62b. A hook sensor portion 62a at a lower part of the lever 62 may be provided so as to be exposed along half of the circumference, for example the rear part, of the through hole 61a. As shown in FIGS. 9 and 10, a press operation portion 62c, which may have a hook-like shape, may be provided at an upper part of the lever 62, above the fulcrum 62b. A switch 63 may be provided at a front part of a hanger portion of the press operation portion 62c. When the switch 63 is pressed, the switch 63 is in a turned ON state. In this state, the switch 63 electrically disconnects the motor 20 from the power source. The electric power can again be supplied to the motor 20 when the switch 63 is in a turned OFF state, which is a state where the switch 63 is not pressed. The lever 62 may be biased such that the hook sensor portion 62a can rotate frontward about the fulcrum 62b while the press operation portion 62c can rotate rearward. In this biased state, the switch 63 is in the turned OFF state since the press operation portion 62c does not press the switch 63.

As shown in FIGS. 9 and 10, the suspending member 8 such as a carabiner, a rope or the like may be inserted through the through hole 61a so as to be attached to the hanger portion 61. The electric power tool 60 may be suspended by hooking the attached suspending member 8 to a hook or the like provided at a handrail or a scaffolding. The center of gravity G of the electric power tool 60 may be located in the vicinity of the motor accommodating portion 2. The suspending member 8 may serve to suspend the electric power tool 60 from above, with respect to a rear semi-peripheral portion of the hanger portion 61 and the hook sensor portion 62a. The electric power tool 60 may be suspended in a posture such that the axis J may be oriented in the gravity direction, the axis passing through the hook sensor portion 62a, shown in FIG. 9 and the center of gravity G while the center of gravity G is below the hook sensor portion 62a. At this time, the suspending member 8 pulls the hook sensor portion 62a in a direction opposite to the direction towards the center of gravity G (in the rearward direction of the electric power tool). As a result, the lever 62 comes to rotate about the fulcrum 62b due to the principle of leverage. Accordingly, the operation portion 62c, shown in FIG. 10, rotates forward and presses the switch 63 so that the switch 63 enters the turned ON state.

As described above, the electric power tool 60 may be suspended by the suspending member 8 in a posture where the axis J, which passes through the hook sensor portion 62a and the center of gravity is oriented in the gravity direction, as shown in FIGS. 8 to 10. As a result, the hook sensor portion 62a is pulled upward by the suspending member 8. Consequently, the switch 63 is placed in the turned ON state and can electrically disconnect the motor 20 from the power source. This makes it possible to prevent the motor 20 from starting, even when the switch lever 7 of the electric power tool 60 in a suspended state is turned ON. Further, the hanger portion 61 may have a half-split structure, split into left and right halves. Thereby, the lever 62, which is provided to extend from inside of the hanger portion 61 to inside of the main body rear portion 4, can be easily attached during assembly.

In some embodiments, the lever 62 may be made of a material having a greater strength or toughness than the outer casing 40. For instance, the lever 62 may be made of metal or of a stronger resin than the outer casing 40. As the majority of the force applied to the hanger portion 61 is anticipated to be at a rear portion of the hanger portion 61 when the electric power tool 1 is hung from the suspending member 8, the rear portion is more likely to break than the other portions. Accordingly, by forming the lever 62 of a stronger or tougher material than the outer casing 40, there is a decreased chance that the hanger portion 61 will break when the electric power tool 1 is hung, thereby preventing it from falling when being suspended. Additionally, since the lever 62 is located on only one side of the hanger portion 41, the overall weight and metal material costs may be reduced, compared to forming a reinforcement member traversing both the front and rear portions of the hanger portion 61.

Hereinafter, a fourth embodiment of the present disclosure will be described with reference to FIGS. 11 to 14. An electric power tool 70 according to the forth embodiment may have the hanger portion 71 shown in FIG. 12, instead of the hanger portion 41 of the electric power tool 1 according to the first embodiment, shown in FIGS. 1 to 4. Furthermore, the electric power tool 70 may further include an indication portion 73 and a deformation detection member 75, shown in FIGS. 13 and 14.

Figure 12:
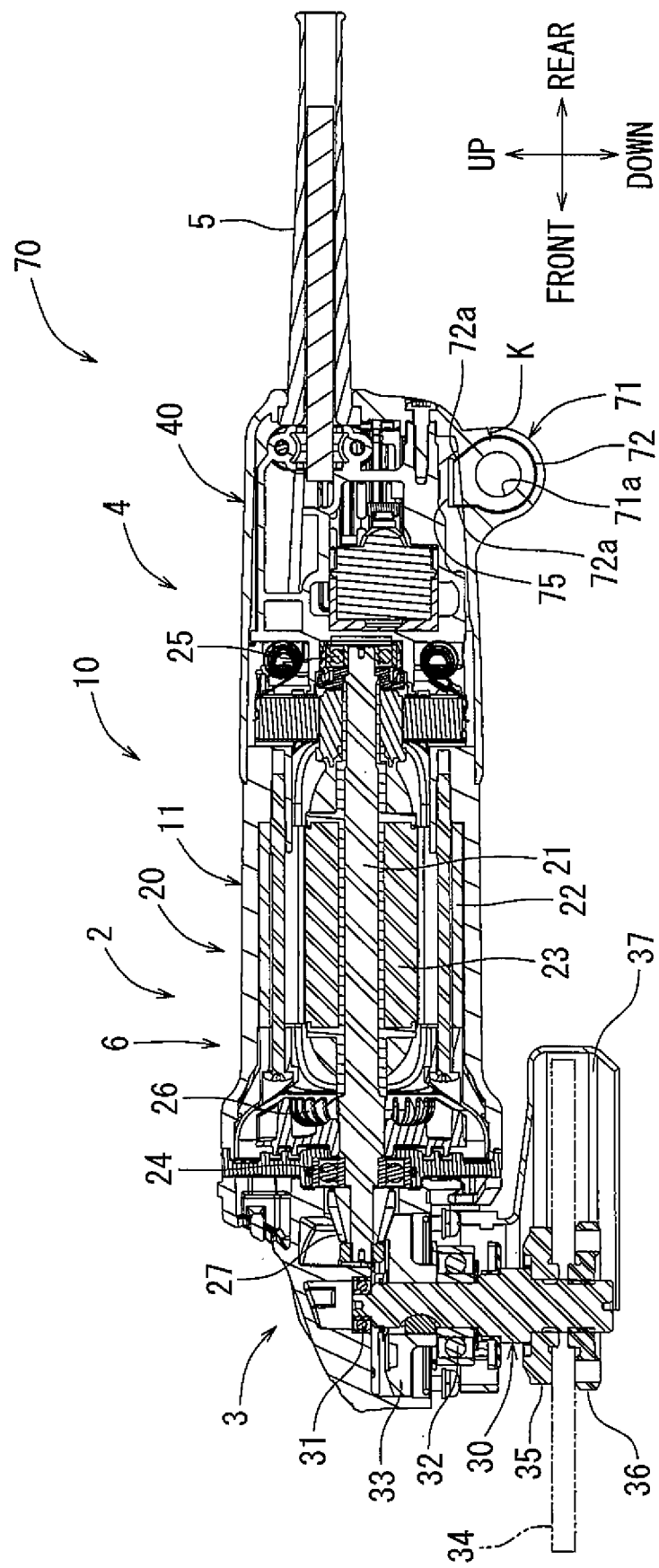
FIG. 12 is a cross-sectional view taken along line XII-XII of FIG. 11.
Figure 14:
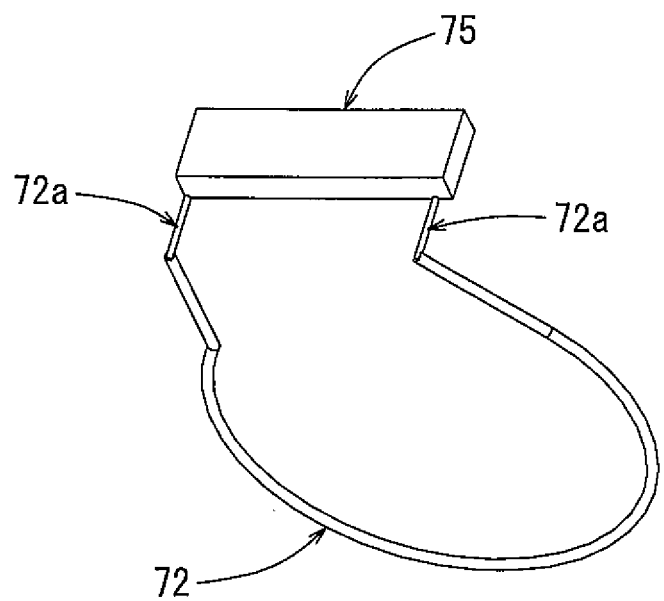
FIG. 14 is a perspective view of a wire and a deformation detecting member.

As shown in FIG. 12, an hanger portion 71, which may be annular, may be provided at a lower portion of the outer casing 40. A through hole 71a may pass through the hanger portion 71 in the left/right direction. The hanger portion 71 may be made of, for example, a resin material having high insulation properties. The outer casing 40 and the hanger portion 71 may be integrally formed and be splittable into the left and right halves. A metal wire (which is an embodiment of a reinforcement member) 72 having a high strength may be annularly provided inside of the hanger portion 71, so as to pass a radially outer side of the through hole 71a. For example, a copper wire having high conductivity properties may be used for the wire 72. The wire 72 may be positioned so as to pass through substantially the center of the hanger portion 71 in the thickness direction. Both ends 72a of the wire 72 may protrude from the inner peripheral surface of the outer casing 40. Both ends 72a may be electrically connected to the deformation detection member 75, as shown in FIGS. 12 and 14. The deformation detection member 75 is electrically connected to a power source and/or a controller.

When the length of the wire 72 stretches due to the plastic deformation of the hanger portion 71, the electrical resistance of the wire 72 increases and the electric current flowing through the wire 72 reduces. As shown in FIG. 12, the electrical resistance of the wire 72 increases and the electric current flowing through the wire 72 reduces also when a crack K formed in the wire 72 and the hanger portion 71 causes the cross-sectional area of a portion of the wire 72 to become smaller. Should the wire 72 break, the electric current will cease to flow. The deformation detection member 75 is able to detect a change in the electrical resistance of wire 72 by measuring a change in the electric current flowing through the wire 72. Accordingly, deformation and damage of the hanger portion 71 and/or the wire 72 greater than the predetermined level may be detected when a change in the electrical resistance of the wire 72 is detected. The detectable deformation and damage may be, for example, an elastic deformation, a plastic deformation, cracks, a breakage, or damage not accompanied by deformation. The hanger portion 71 may soon be damaged or is already damaged when the electrical resistance of the wire 72 is particularly large. Therefore, detection is quite useful.

Figure 11:
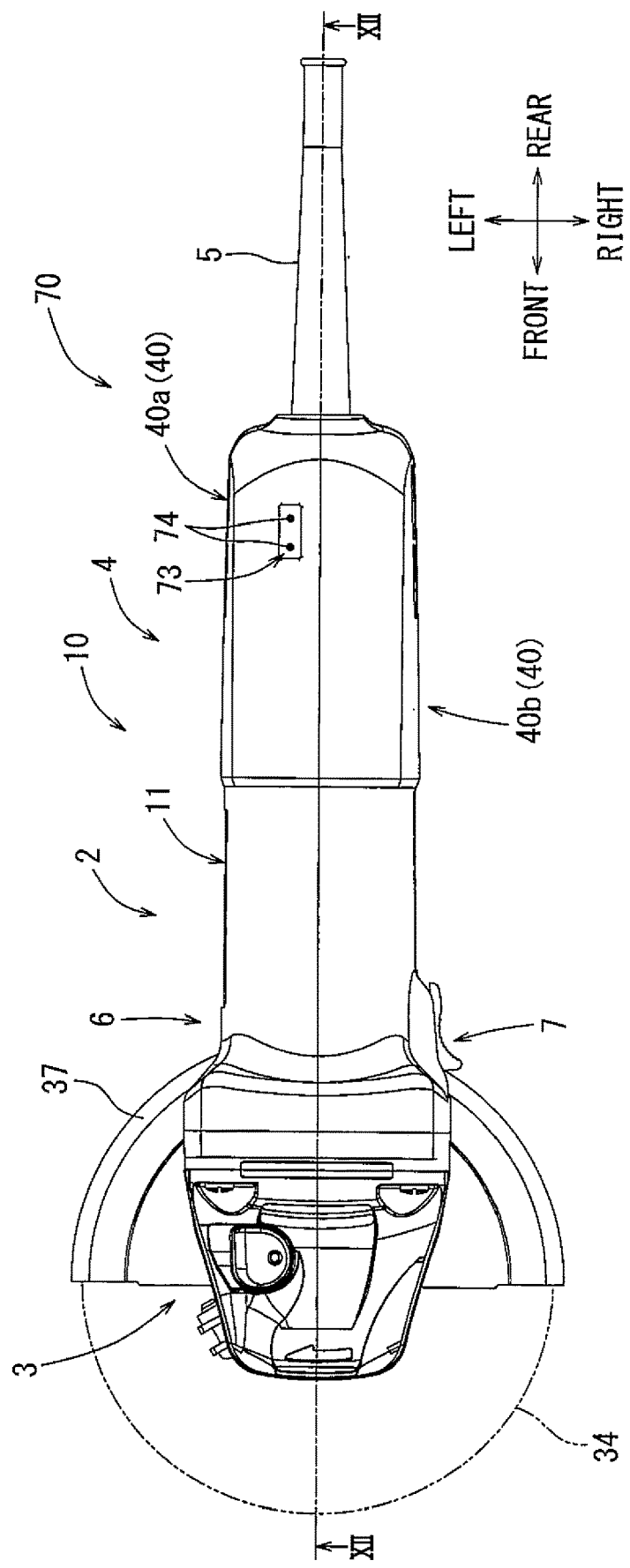
FIG. 11 is a plan view of the electric power tool according to a fourth embodiment.
Figure 13:
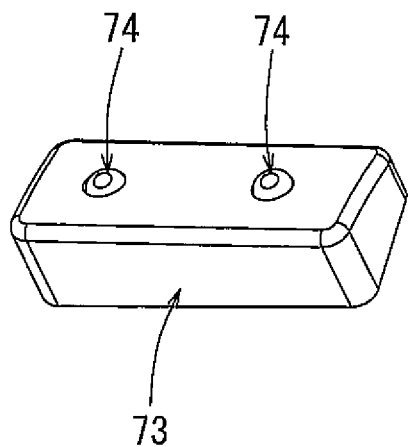
FIG. 13 is a perspective view of an indication portion and alarm lamps.

As shown in FIGS. 11 to 13, when the deformation detection member 75 detects that the electric current flowing through the wire 72 is less than the predetermined value, the alarm lamp (which is an embodiment of an alarm means) 74 on the indication portion 73, which is electrically connected to the deformation detection member 75, illuminates. Further, when the deformation detection member 75 detects that the electric current flowing through the wire 72 is less than the predetermined value, the switch lever 7 is electrically disconnected from the motor 20.

As described above, when the hanger portion 71 or the wire 72 is plastically deformed, cracked, or broken, etc., the deformation detection member 75 detects the deformation of the hanger portion 71 and/or the wire 72 as shown in FIG. 12. The alarm lamp 74, as an alarm means, illuminates when the deformation detection member 75 detects the deformation. The user can thus be made aware that the hanger portion 71 is deformed or damaged more than a predetermined level, because of the illuminated alarm lamp 74.

Further, it is possible to prevent the motor 20 from starting when the suspended electric power tool 70 is falling, i.e., when the hanger portion 71 is greatly deformed or damaged. For example, the motor 20 can be prevented from starting even when the switch lever (which is an embodiment of a main switch) 7 is turned on, for example, due to the falling impact of the electric power tool 70. The hanger portion 71 may further have a half-split structure which can be split into left and right halves. This enables the wire 72 or the deformation detection member 75 to be easily attached.

Hereinafter, a fifth embodiment of the present disclosure will be described with reference to FIGS. 15 to 20. An electric power tool 80 according to the fifth embodiment may have a hanger portion 81 shown in FIGS. 15 to 20, instead of the hanger portion 41 of the electric power tool 1 according to the first embodiment shown in FIGS. 1 to 4.

Figure 15:
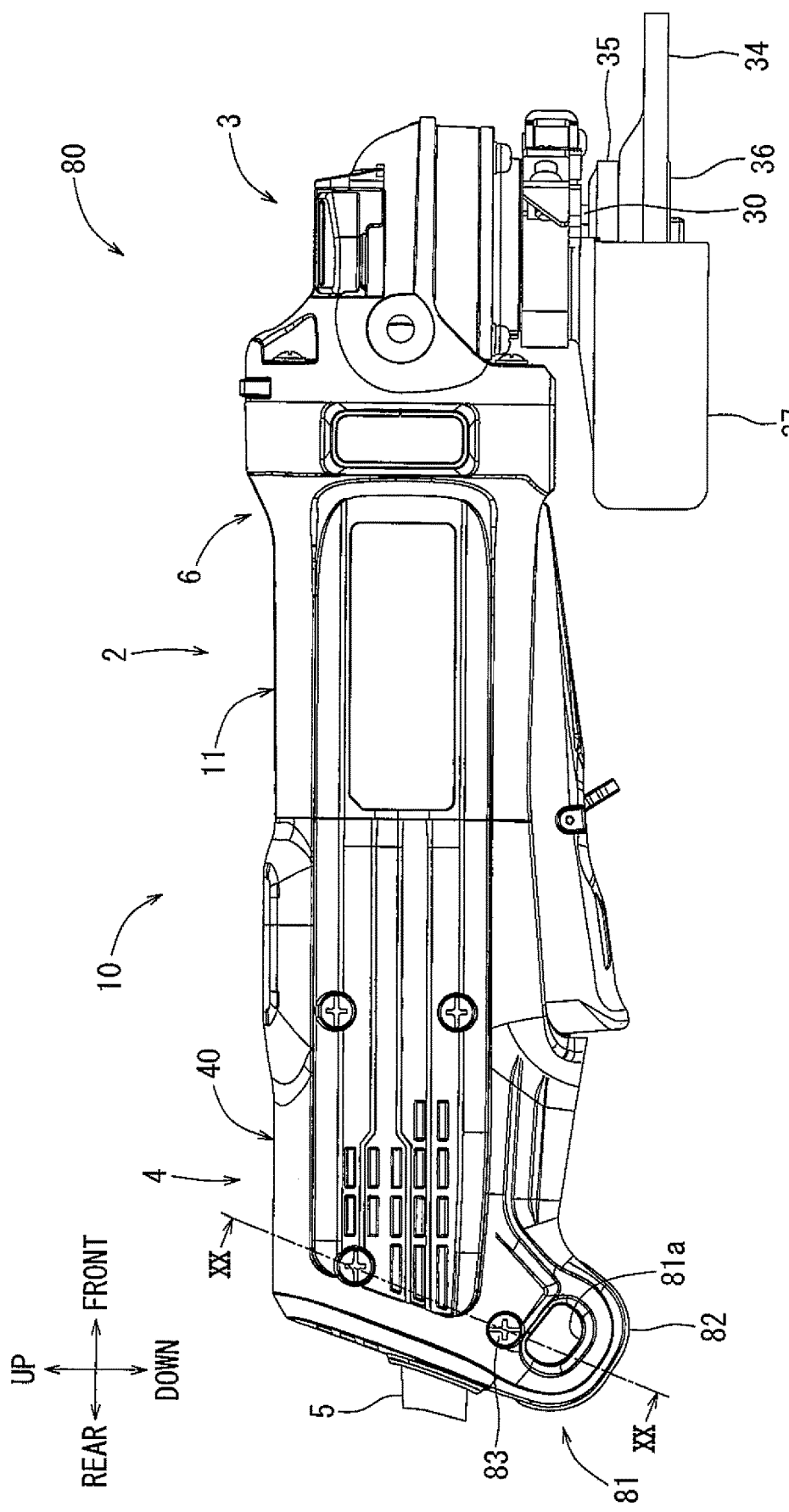
FIG. 15 is a back side view of the electric power tool according to a fifth embodiment
Figure 16:
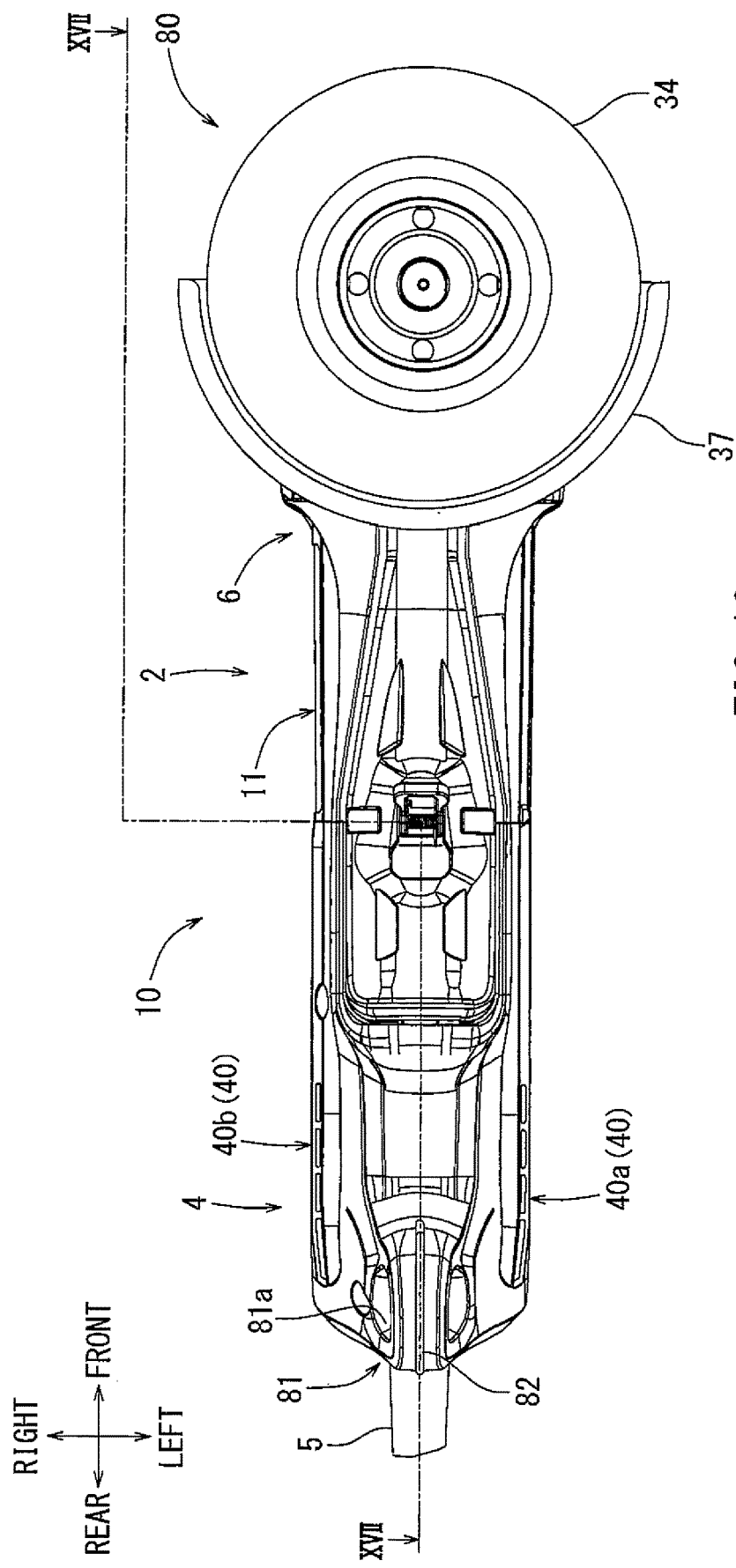
FIG. 16 is a bottom view of the electric power tool according to the fifth embodiment.
Figure 17:
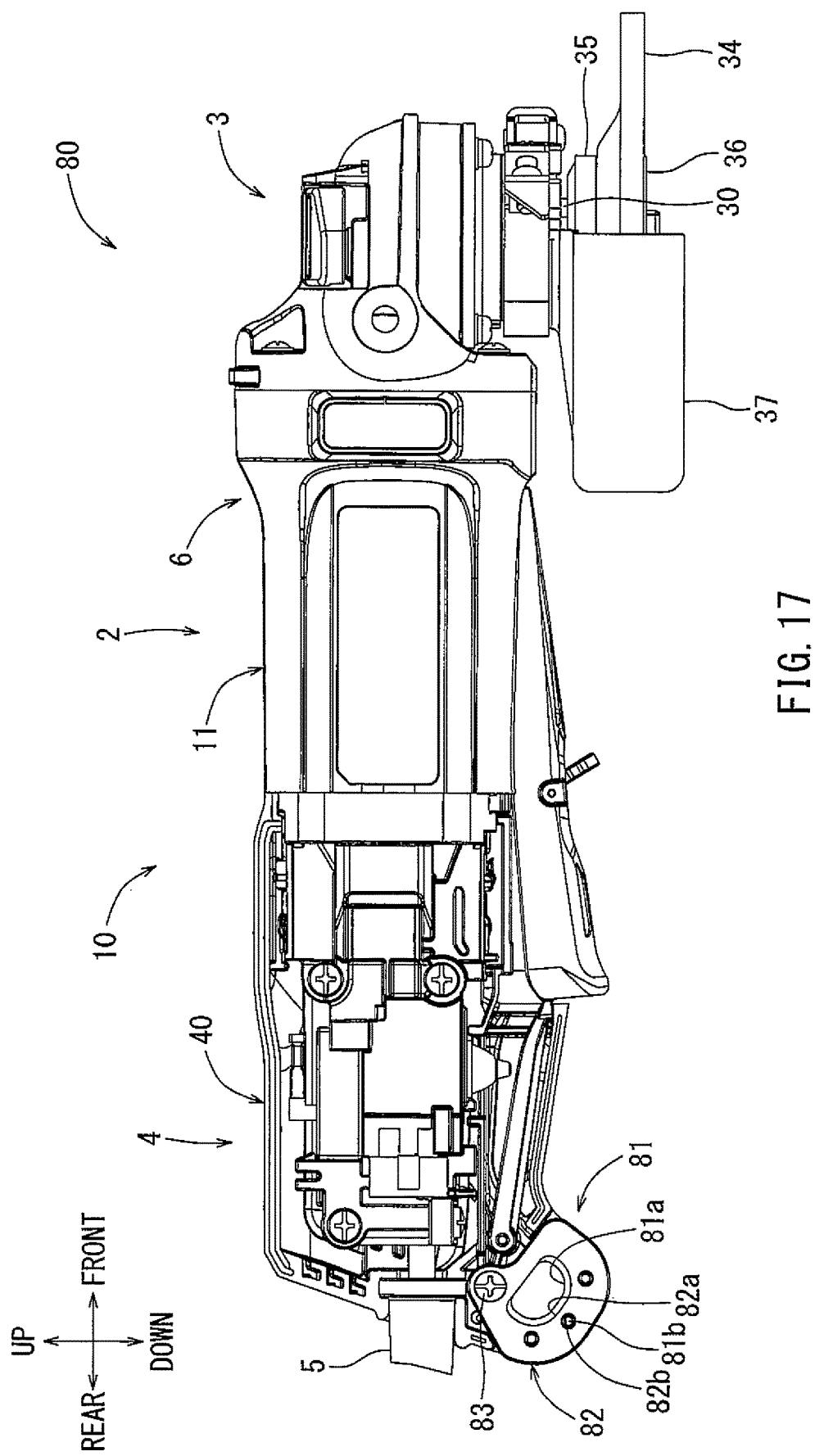
FIG. 17 is a cross-sectional view taken along line XVII-XVII of FIG. 16.

As shown in FIGS. 15 to 17, an hanger portion 81, which may be annular, may be provided at a lower portion of the outer casing 40. A through hole 81*a* may pass through the hanger portion 81 in the left/right direction. A high-strength metallic sheet metal (which is an embodiment of a reinforcement member) 82 may be provided in substantially the center of the hanger portion 81 in the left/right direction. The sheet metal 82 may be in a posture with its thickness direction set as the left/right direction. As viewed from the left/right direction, the sheet metal 82 may have a contour protruding in the radial direction slightly outward from an outer contour of a resin part of the hanger portion 81. The sheet metal 82 may have a through hole 82*a* having substantially the same shape as the through hole 81*a* passing through the hanger portion 81 in the left/right direction. The suspending member 8 may be attached to the hanger portion 81 through both the through hole 81*a* of the hanger portion 81 and the through hole 82*a* of the sheet metal 82.

Figure 20:
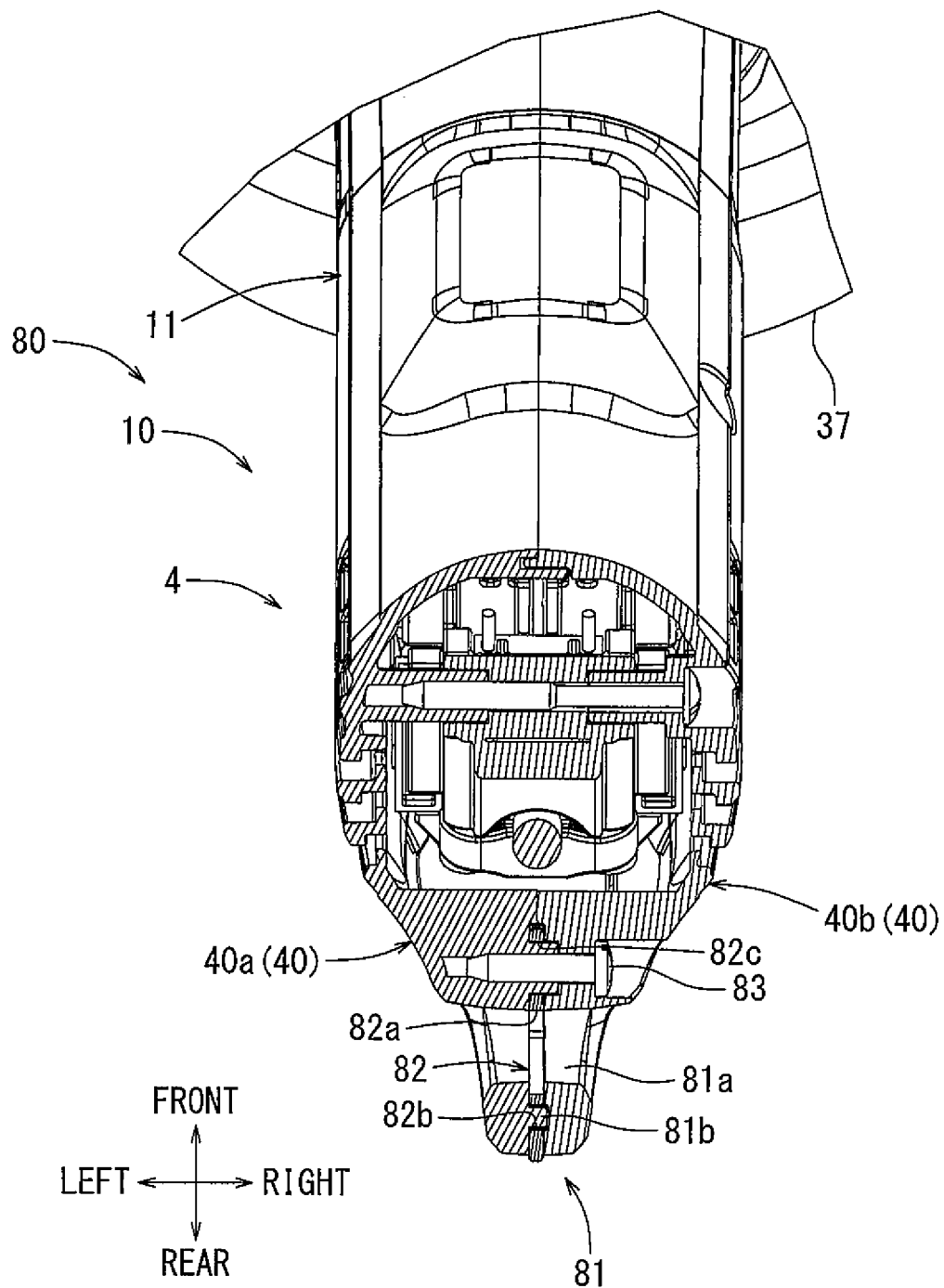
FIG. 20 is a cross-sectional view taken along line XX-XX of FIG. 15.

As shown in FIG. 20, the sheet metal 82 may be attached while being positioned between left half-split portion 40*a* and right half-split portion 40*b*. A hole extending through the thickness direction, for example a screw fixing hole 82*c*, may be formed in the upper part of the sheet metal 82. A rod member, for example, a fixing screw 83, may be inserted in the screw fixing hole 82*c* to tighten a left half-split portion 40*a*, the sheet metal 82, and a right half-split portion 40*b* by tightening the fixing screw 83. Thereby, the sheet metal 82 is screwed to the outer casing 40.

Figure 18:
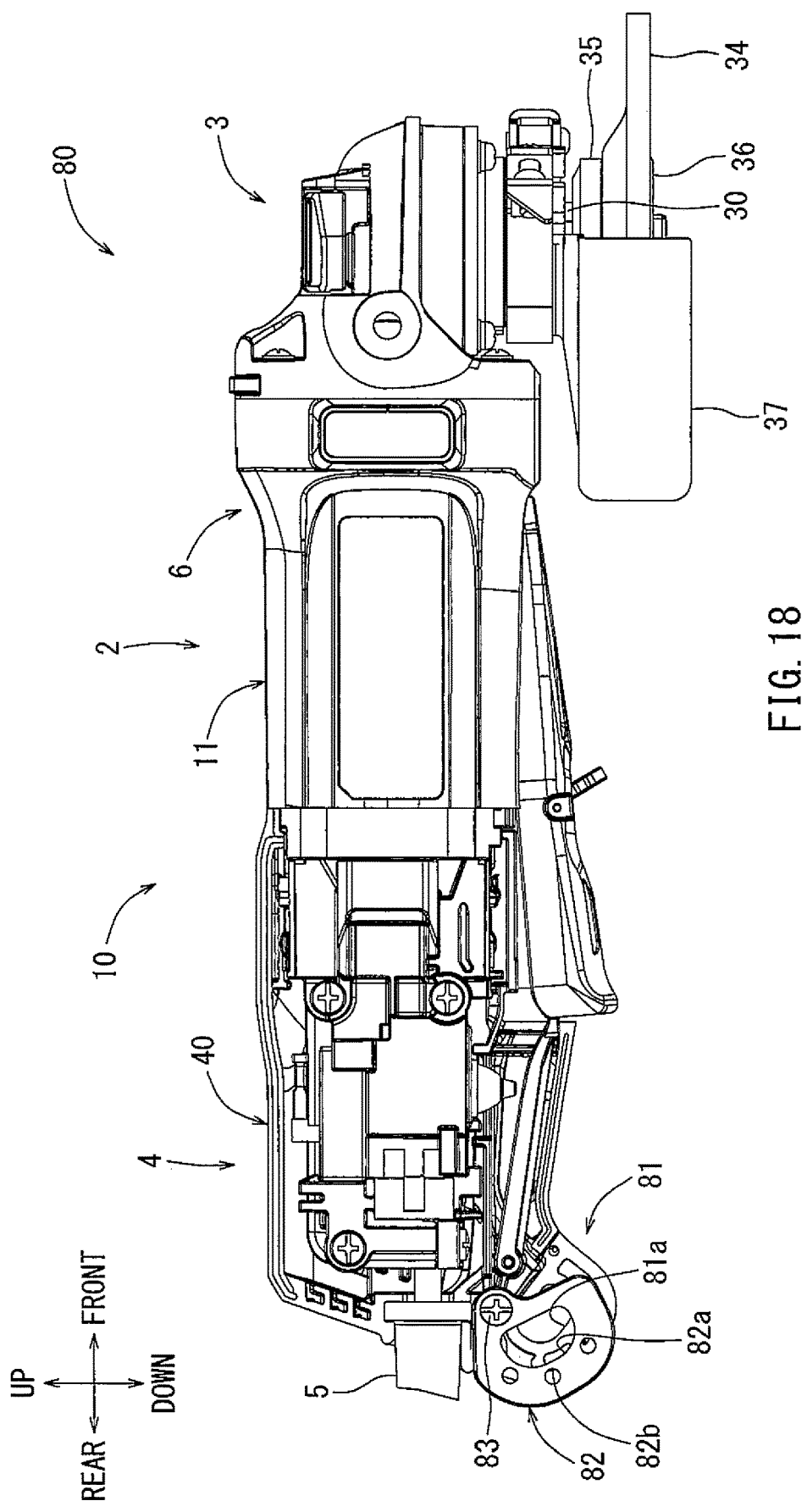
FIG. 18 is a cross-sectional view taken along line XVII-XVII of FIG. 16, illustrating that the reinforcement member is displaced.

As shown in FIGS. 16 to 18, the sheet metal 82 may be supported to the outer casing 40 by the fixing screw 83. As shown in FIG. 17, the sheet metal 82 may be provided with an engagement hole 82*b* passing through the thickness direction. A boss 81*b* extending in the left/right direction at a boundary with the left and right half structures may be formed on the resin part of the hanger portion 81. The boss 81*b* may be provided in a position to engage the engagement hole 82*b* when the shape of the resin part of the hanger portion 81 and the shape of the sheet metal 82 substantially overlap in the left/right direction. This state is an initial state in which the electric power tool 80 can be used as usual. The sheet metal 82 is prevented from being displacing due to the frictional resistance received from the left half-split portion 40*a* and right half-split portion 40*b* and the boss 81*b* that engages the engagement hole 82*b*. This prevents the sheet metal 82 from rotating about the fixing screw 83, thereby maintaining the sheet metal 82 in the initial position with respect to the hanger portion 81.

As shown in FIG. 18, the engagement of the boss 81*b* with the engagement hole 82*b* is released when the resin part of the hanger portion 81 is plastically deformed or damaged due to, for example, the impact of the electric power tool 80 falling. At this time, the sheet metal 82 rotates about the fixing screw 83 so that the outer shape of the sheet metal 82 is exposed, while being shifted from the outer shape of the resin part of the hanger portion 81. The sheet metal 82 is screwed to both of the left half-split portion 40*a* and right half-split portion 40*b* by the fixing screw 83. This prevents the sheet metal 82 from falling out of the outer casing 40, even when the sheet metal 82 and the resin part of the hanger portion 81 are shifted.

As described above, the high-strength metallic sheet metal 82 may be provided as a reinforcement member in substantially the center of the hanger portion 81 in the left/right direction, as shown in FIGS. 16 and 17. Thereby, the strength of the hanger portion 81 can be enhanced, and the deformation and the damage of the hanger portion 81 can be reduced. The suspending member 8 may pass through the both of the through hole 81*a* of the hanger portion 81 and through hole 82*a* of the sheet metal 82. Even when the resin part of the hanger portion 81 with the through hole 81*a* breaks, the sheet metal 82 with the through hole 82*a* does not break. It is thus possible to prevent the electric power tool 80 from falling when the suspending member 8 passing through the hanger portion 81 is hooked to a hook or the like provided at a handrail or a scaffolding. Furthermore, the hanger portion 81 may include a half-split structure, split into left and right halves. The sheet metal 82 is therefore easily attached to the hanger portion 81.

Figure 19:
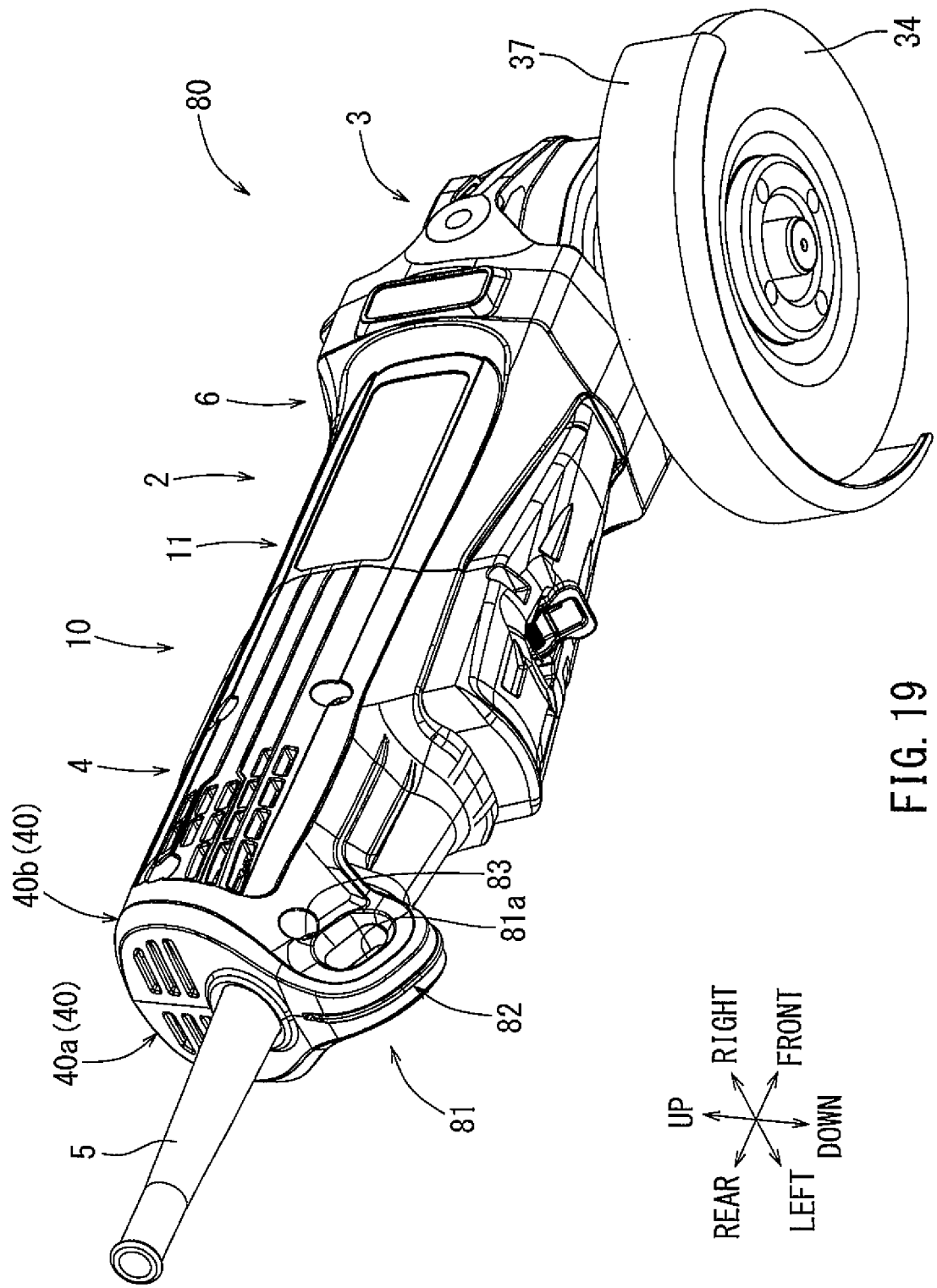
FIG. 19 is a perspective view of the electric power tool according to the fifth embodiment.

As shown in FIG. 18, the sheet metal 82 may be supported to the outer casing 40 such that the sheet metal 82 is displaced with respect to the hanger portion 81 and exposed from the hanger portion 81 when an impact is applied at such a level that the resin part of the hanger portion 81 plastically deforms or is damaged by more than the predetermined level from the initial state. The user can thus visually recognize that the hanger portion 81 is plastically deformed or damaged by more than the predetermined level. In other words, the sheet metal 82 serves also as an alarm means for informing the user of the deformation or the damage of the hanger portion 81. Further, as shown in FIGS. 15 and 19, the sheet metal 82 may have a contour protruding, in the radial direction, slightly outward from a contour of the resin part of the hanger portion 81. The sheet metal 82 thus comes in contact with a work table or a floor, etc. prior to the resin part of the hanger portion 81, when the electric power tool 80 is placed on the work table, or, floor, etc. This may prevent the hanger portion 81 from wearing down.

Hereinafter, a sixth embodiment according to the present disclosure will be described with reference to FIG. 21. An electric power tool 90 according to the sixth embodiment may have a hanger portion 91 shown in FIG. 21, instead of the hanger portion 41 of the electric power tool 1 according to the first embodiment shown in FIGS. 1 to 4. The electric power tool 90 shown in FIG. 21 may be an electric power tool referred to as a so-called reciprocating saw, which is used when cutting a workpiece by reciprocally moving a saw blade. The electric power tool in this embodiment may be a grinder shown in FIG. 1, etc., instead of a reciprocating saw.

Figure 21:
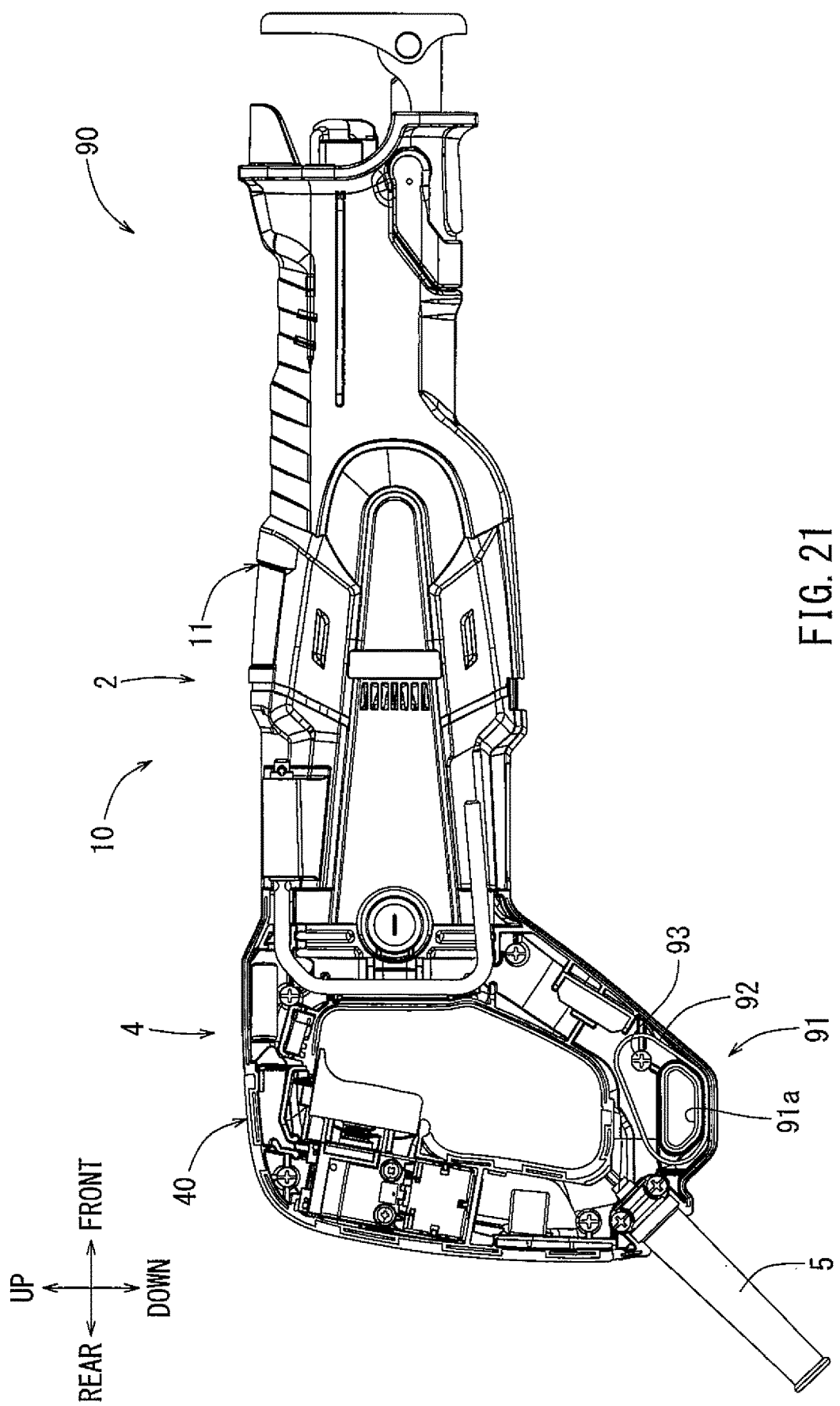
FIG. 21 is a back side view, including a vertical cross-sectional view of a main body rear portion of the electric power tool according to a sixth embodiment.

As shown in FIG. 21, an hanger portion 91, which may be annular, may be provided at a lower portion of the outer casing 40. A through hole 91*a* may pass through the hanger portion 91 in the left/right direction. The outer casing 40 and the hanger portion 91 may be integrally formed and be splittable into the left and right halves. A fixing screw (which is an embodiment of a columnar portion) 93 may be attached near the upper part of the through hole 91*a*. The fixing screw 93 may be configured for mounting the outer casing 40, which is split into the left and right halves, and the hanger portion 91.

As shown in FIG. 21, the hanger portion 91 may have an linear member 92, which may be annular, enclosing both of the through hole 91*a* and the fixing screw 93 therein. The linear member 92 may be formed of a flexible material which does not easily break due to a falling impact, etc. The linear member 92 may have a tensile strength (toughness) strong enough to suspend the weight of the electric power tool 90. The linear member 92 may be a band made of, for example, cloth or vinyl. The linear member 92 may be accommodated in the hanger portion 91 and the outer casing 40 when the half-split structure split into left and right halves of the outer casing 40 is attached. The linear member 92 may be in a posture in which a width direction of the band is set as a left/right direction.

As described above, the linear member 92 provided in the hanger portion 91 may have an annular shape enclosing both of the through hole 91*a* and the fixing screw (columnar portion) 93 therein, as shown in in FIG. 21. Therefore, since the linear member 92 is made of a flexible material, it does not easily break due to a falling impact, etc. The suspending member 8 may be attached by passing through a ring shape of the linear member 92 and the through hole 91*a*. Thus, the suspending member 8 does not easily slip out from the linear member 92, even when the resin portion of the hanger portion 91 breaks due to a falling impact or the like. Further, the linear member 92 may be hooked to the fixing screw 93, the fixing screw 93 having a relatively high strength. The fixing screw 93 may be attached to the outer casing 40. Therefore, the linear member 92 does not easily slip out of the outer casing 40, even when a part of the hanger portion 91 breaks. The electric power tool 90 is thus prevented from falling, etc., when the suspending member 8 passing through the suspending portion 91 is hooked to a hook or the like provided at a handrail or a scaffolding.

In the embodiment shown in FIG. 21, the linear member 92 encloses the fixing screw 93 therein. Alternatively, the linear member 92 may enclose another columnar portion, such as a boss, inside. The columnar portion may extend within the outer casing 40, in the left/right direction. For example, the columnar portion may be provided on one of the left half-split portion 40*a* and right half-split portion 40*b*, and in contact with the other. This reinforces the strength of the left half-split portion 40*a* and right half-split portion 40*b* in the left/right direction. The linear member 92 does not slip out from the outer casing 40 when the linear member 92 is hooked to such a columnar portion. Furthermore, the linear member 92 may be a cloth band, a vinyl band, or the like having a relatively simple structure. Therefore, the linear member 92 can be made lightweight and relatively inexpensive.

Hereinafter, a seventh embodiment according to the present disclosure will be described with reference to FIG. 22. An electric power tool 100 according to the seventh embodiment may have a ring 101, shown in FIG. 22, instead of the hanger portion 91 of the electric power tool 90 according to the sixth embodiment shown in FIG. 21.

Figure 22:
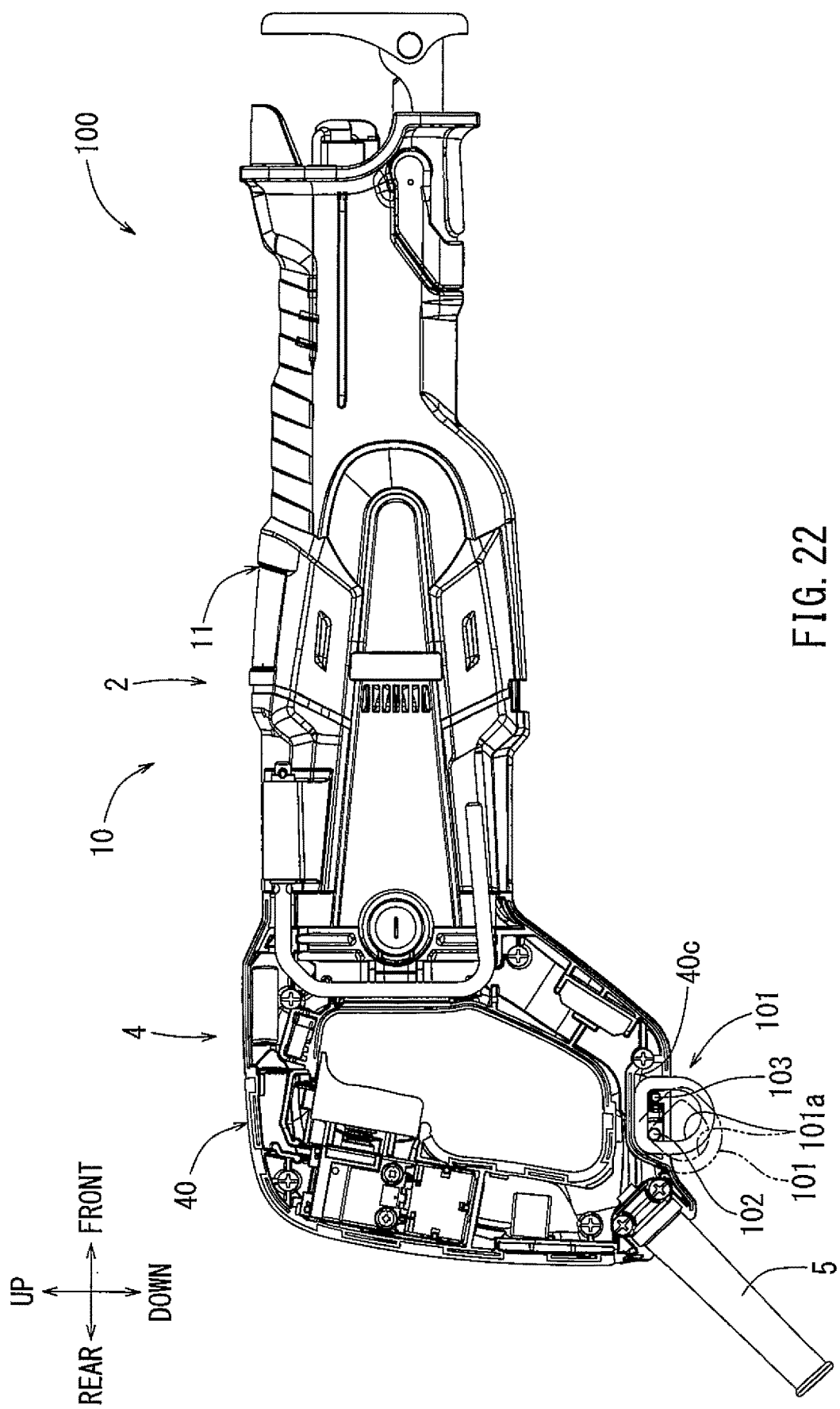
FIG. 22 is a back side view, including a vertical cross-sectional view of the main body rear portion of the electric power tool according to a seventh embodiment.

As shown in FIG. 22, a ring (which is an embodiment of a hanger portion) 101, which may be annular, may be provided at a lower portion of the outer casing 40. A through hole 101*a* may pass through the ring 101 in the left/right direction. The ring 101 may be made of metal, have a greater strength than resin, and be formed of one member. A recess 40*c* may be provided at the lower portion of the outer casing 40 to which an upper portion of the ring 101 may be attached. A rear support portion 102 and front support portion 103, each of which may be columnar, extending in the left/right direction may be provided in an upright manner in the recess 40*c*. The rear support portion 102 and front support portion 103 may support the left and right half-split portions of the outer casing 40, thereby reinforcing the strength of the outer casing 40 in the left/right direction. The ring 101 may be attached to the left and right half structures of the outer casing 40 with both of the rear supporting portion 102 and front supporting portion 103 inserted into the through hole 101*a* of the ring 101.

As shown in FIG. 22, the rear support portion 102 and the front support portion 103 may be integrally formed with the outer casing 40. The rear support portion 102 and the front support portion 103 may be made of, for example, a resin similar to that of the outer casing 40. The diameter of the rear support portion 102 may be larger than that of the front support portion 103. The rear support portion 102 thus has a greater strength and does not easily break, while the front support portion 103 has a lower strength than that of the rear support portion 102 and thus breaks comparatively more easily. Alternatively, the rear support portion 102 may be formed of a material having a greater strength than the front support portion 103. The rear support portion 102 may be made of, for example, metal having a high strength. The front support portion 103 may, for example, be integrally formed with the outer casing 40 and may be made of resin. The rear support portion 102 has greater strength and thus does not easily break, while the front support portion 103 has lower strength than that of the rear support portion 102 and thus breaks comparatively more easily. When the front support portion 103 breaks due to a falling impact, etc. of the electric power tool 100, the front support portion 103 is removed from the through hole 101*a*. Accordingly, as indicated by a two-dot-chain line in FIG. 22, the ring 101 is supported only by the rear support portion 102. Therefore, the ring 101 may be incline rearward when the electric power tool 100 is suspended by the suspending member 8 inserted in the through hole 101*a*.

As described above, the ring 101 may be attached to the outer casing 40 while being supported by both the rear support portion (which is an embodiment of a first column) 102 and the front support portion (which is an embodiment of a second column) 103, as shown in FIG. 22. The rear support portion 102 is provided so as to have a greater strength than the front support portion 103. The rear support portion 102 does not break and the ring 101 is supported by the rear support portion 102 even when the front support portion 103 breaks due to a falling impact, etc. As a result, the ring 101 is supported only by the rear support portion 102 and inclines rearward. This enables the ring 101 to serve also as an alarm means, which informs the user that the support structure of the ring 101 broke. Since the ring 101 is made of a metal having a high strength, this may also serve as a reinforcement member. Further, since the outer casing 40 has a half-split structure in the left/right direction, the ring 101 can be easily attached to the outer casing 40.

Figure 23:
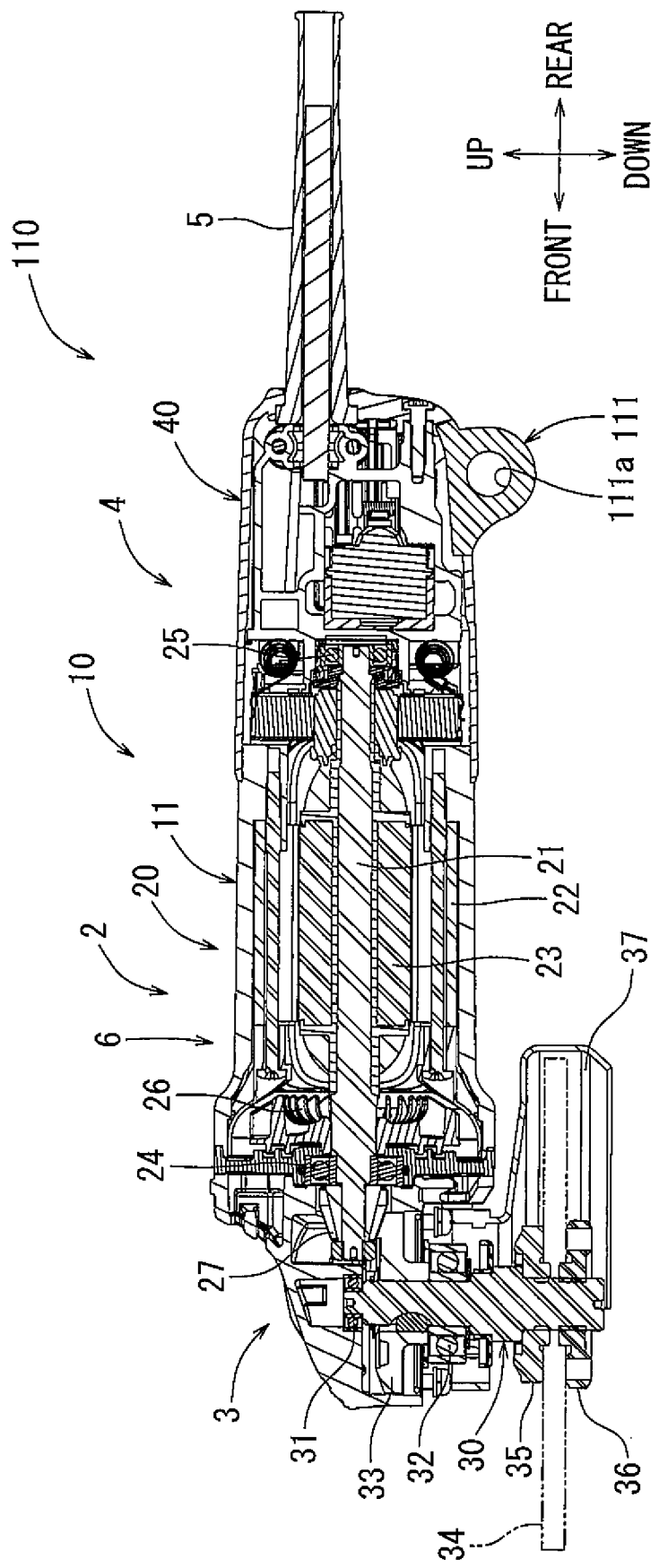
FIG. 23 is a vertical cross-sectional view of the electric power tool according to an eighth embodiment.

Hereinafter, an eighth embodiment according to the present disclosure will be described with reference to FIG. 23. An electric power tool 110 according to the eighth embodiment may have a hanger portion 111, shown in FIG. 23, with an integrally formed hanger portion and reinforcement member, instead of the hanger portion 51 and the ring 52 of the electric power tool 50 according to the second embodiment shown in FIGS. 5 and 6. The hanger portion 111 of the eighth embodiment may have a through hole 111a passing through in the left/right direction. The suspending member 8 may be attached to be in the through hole 111a. The hanger portion 111 may be attached to the outer casing 40, while being positioned between the left half-split portion 40a and the right half-split portion 40b, which are part of the left and right half-split structure.

As described above, the hanger portion 111 may also function as a reinforcement member, in addition to functioning as a hanger portion to which the suspending member 8 can be attached. This makes it is possible to simplify the structure of a hanger portion 111 that is resistant to deformation and breakage. Further, the hanger portion 111 can be easily attached to the outer casing 40, since the outer casing 40 has a half-split structure in the left/right direction.

Various modifications may be made to the electric power tool 1, 50, 60, 70, 80, 90, 100, 110 according to any of the first to eighth embodiments described above. The structure of the hanger portion 41, 51, 61, 71, 81, 91, 101, 111 may be provided not only individually but also in an appropriate combination. In the first to eighth embodiments, the electric power tool may have a power cord 5 configured to supply electric power from the external power source. Alternatively, the electric power tool may have a battery mounting portion to or from which a battery pack is attached or removed. The battery pack may be, for example, a rechargeable battery that can be repeatedly used by charging with a separately prepared charger.

The reinforcing member, such as the wire 42, 72, the ring 52, 101, the sheet metal 82, and the hanger portion 111 may be made of a material having a high strength such as, for example, metal or a carbon fiber reinforced plastic (CFRP). As described-above, the wire 42, 72, the ring 52, 101, the sheet metal 82, the linear member 92, and the hanger portion 111 may be assembled while being interleaved between the left and right half-split structures of the outer casing 40. Alternatively, they may be assembled by insert molding when molding the resin part of the hanger portion.

A suspension detecting member may include a hook sensor portion 62a as shown in FIGS. 9 and 10. Alternatively, the suspension detecting member may have an electric component using, for example, a micro switch or a pressure element. An alarm means may be a sound generator using a sound such as, for example, a buzzer.

The electric power tool 1, 50, 60, 70, 80, 110 is not limited to have a motor 20 in an arrangement posture or a grip portion 6 in an arrangement position as illustrated in the first to fifth and eighth embodiments, but may have a different arrangement. The electric power tool may be a grinder or a reciprocating saw or may also be other various portable electric power tool or a power tool that can be suspended.

What is claimed is:

1. An electric power tool, comprising:
   a motor;
   a power source configured to supply electric power to the motor; and
   an hanger portion (i) having substantially an annular shape with a through hole, (ii) on an outer surface of an outer casing and (iii) configured such that a suspending member can be attached to the hanger portion, wherein the hanger portion has a reinforcement member, and
   the reinforcement member is supported to the outer casing such that the reinforcement member is configured to be displaced relative to the hanger portion when the hanger portion is plastically deformed by more than a predetermined amount from an initial state or when the hanger portion is damaged.

2. The electric power tool as defined in claim 1, wherein the reinforcement member (i) comprises a metal material and (ii) is embedded in the hanger portion.

3. An electric power tool, comprising:
   a motor;
   a power source configured to supply electric power to the motor; and
   a hanger portion having a through hole and extending from an outer surface of an outer casing, wherein:
   the hanger portion comprises a reinforcement member having a greater strength or toughness than the outer; and
   the reinforcement member is supported to the outer casing such that the reinforcement member is configured to be displaced relative to the hanger portion when the hanger portion is plastically deformed by more than a predetermined amount from an initial state or when the hanger portion is damaged.

4. The electric power tool as defined in claim 3, wherein the reinforcement member is positioned along a plane substantially parallel to or coincident with a motor axis of the motor.

5. The electric power tool of claim 3, wherein the reinforcement member is positioned between outermost edges of the hanger portion in a direction parallel to a central axis of the through hole of the hanger portion.

6. An electric power tool, comprising:
   a motor;
   a power source configured to supply electric power to the motor;
   a hanger portion having a through hole and extending from an outer surface of an outer casing; and
   a reinforcement member positioned at least partly within the hanger portion and having a greater strength or toughness than the outer casing, wherein:
   at least a part the reinforcement member is positioned between an inner surface of the hanger portion defining the through hole and an outer surface of the hanger portion opposite the inner surface; and
   the reinforcement member is supported to the outer casing such that the reinforcement member is configured to be displaced relative to the hanger portion when the hanger portion is plastically deformed by more than a predetermined amount from an initial state or when the hanger portion is damaged.

* * * * *